(12) United States Patent
Oba et al.

(10) Patent No.: US 8,091,661 B2
(45) Date of Patent: Jan. 10, 2012

(54) POWER OUTPUT APPARATUS AND HYBRID VEHICLE

(75) Inventors: Hidehiro Oba, Aichi-ken (JP); Yukihiko Ideshio, Susono (JP)

(73) Assignee: Toyota Jidosha Kabushiki Kaisha, Toyota-shi (JP)

(*) Notice: Subject to any disclaimer, the term of this patent is extended or adjusted under 35 U.S.C. 154(b) by 364 days.

(21) Appl. No.: 12/447,059

(22) PCT Filed: Oct. 19, 2007

(86) PCT No.: PCT/JP2007/070438
§ 371 (c)(1),
(2), (4) Date: Apr. 24, 2009

(87) PCT Pub. No.: WO2008/050683
PCT Pub. Date: May 2, 2008

(65) Prior Publication Data
US 2009/0301800 A1  Dec. 10, 2009

(30) Foreign Application Priority Data

Oct. 24, 2006 (JP) .................... 2006-288668

(51) Int. Cl.
*B60K 6/48* (2007.10)
(52) U.S. Cl. .................................................. 180/65.25
(58) Field of Classification Search ............. 180/65.25
See application file for complete search history.

(56) References Cited

U.S. PATENT DOCUMENTS 5,669,842 A   9/1997  Schmidt

FOREIGN PATENT DOCUMENTS

| JP | 07-336810 A | 12/1995 |
| JP | 2000-062483 A | 2/2000 |
| JP | 2000-108693 A | 4/2000 |
| JP | 2000-326739 A | 11/2000 |
| JP | 2003-104072 A | 4/2003 |
| JP | 2003-106389 A | 4/2003 |
| JP | 2005-125876 A | 5/2005 |
| JP | 2005-155891 A | 6/2005 |
| JP | 2005-170227 A | 6/2005 |
| JP | 2005-297786 A | 10/2005 |

*Primary Examiner* — Eric Culbreth
(74) *Attorney, Agent, or Firm* — Kenyon & Kenyon LLP

(57) ABSTRACT

A hybrid vehicle includes an engine, motors, and a power distribution and integration mechanism that are coaxially arranged with respect to each other. The hybrid vehicle also includes a transmission including a transmission differential rotation mechanism that has a sun gear as an input element connected to a sun gear which is a first element of the power distribution and integration mechanism, a ring gear as a fixing element, and a carrier as an output element, and that is configured such that these three elements can differentially rotate with each other; and a clutch as a coupling mechanism capable of selectively coupling the sun gear of the transmission differential rotation mechanism and the carrier which is the second element of the power distribution and integration mechanism with a drive shaft.

14 Claims, 11 Drawing Sheets

FIG. 6

|  | SPEED STATE | CLUTCH C1 | CLUTCH C0 |
|---|---|---|---|
| ENGINE OPERATION TIME | 1ST SPEED | L | M |
|  | 1ST AND 2ND SIMULTANEOUS ENGAGEMENT | M | M |
|  | 2ND SPEED | R | M |
|  | 2ND SPEED MG1 FIXED | R | R |
| MOTOR DRIVE TIME | 1ST SPEED | L | M or L |
|  | 1ST AND 2ND SIMULTANEOUS ENGAGEMENT | M | L |
|  | 2ND SPEED | R | M or L |

FIG. 11

| | SPEED STATE | C1a | C1b | C0' | B0 |
|---|---|---|---|---|---|
| ENGINE OPERATION TIME | 1ST SPEED | O | × | O | × |
| | 1ST AND 2ND SIMULTANEOUS ENGAGEMENT | O | O | O | × |
| | 2ND SPEED | × | O | O | × |
| | 2ND SPEED MG1 FIXED | × | O | O | O |
| MOTOR DRIVE TIME | 1ST SPEED | O | × | O or × | × |
| | 1ST AND 2ND SIMULTANEOUS ENGAGEMENT | O | O | × | × |
| | 2ND SPEED | × | O | O or × | × |

("O" indicates "connection", " × " indicates "disconnection")

POWER OUTPUT APPARATUS AND HYBRID VEHICLE

This is a 371 national phase application of PCT/JP2007/070438 filed 19 Oct. 2007, claiming priority to Japanese Patent Application No. JP 2006-288668 filed 24 Oct. 2006, the contents of which are incorporated herein by reference.

TECHNICAL FIELD

The present invention relates to a power output apparatus for outputting power to a drive shaft and a hybrid vehicle having the same.

BACKGROUND ART

Conventionally, as such a power output apparatus, there has been known a power output apparatus including an internal combustion engine, two motors, a so-called ravigneaux planetary gear mechanism, a parallel shaft-type transmission capable of selectively coupling two output elements of the planetary gear mechanism to an output shaft (for example, see Patent Document 1). In addition, conventionally, there has been known a power output apparatus including a planetary gear device having an input element connected to an internal combustion engine and two output elements; and a parallel shaft-type transmission having a countershaft connected respectively to a corresponding output element of the planetary gear mechanism (for example, see Patent Document 2). According to the power output apparatus, each of the two output elements of the planetary gear device is fixed respectively to an inner periphery of a corresponding rotor in an electric drive section. Further, conventionally, there has been known a power output apparatus including a power distribution mechanism having an input element connected to an internal combustion engine, a reaction element connected to a first motor generator, and an output element connected to a second motor generator; and two clutches for selectively connecting an axle shaft serving as the output member to between the output element and the reaction element of the power distribution mechanism (for example, see Patent Document 3). According to the power output apparatus, when a first motor generator starts to perform power operation at a negative rotation, the two clutches are controlled so as to connect the reaction element of the power distribution mechanism to the output member and release the connection between the output element and the output member. This can suppress the occurrence of power circulation which causes the first motor generator to be driven by an electric power generated by the second motor generator using part of power of the output member.

[Patent Document 1] Japanese Patent Laid-Open No. 2005-155891
[Patent Document 2] Japanese Patent Laid-Open No. 2003-106389
[Patent Document 3] Japanese Patent Laid-Open No. 2005-125876

DISCLOSURE OF THE INVENTION

The above described power output apparatuses can operate the internal combustion engine at an effective operation point by outputting a requested power to a drive shaft by causing the two motors to perform torque conversion on power from the internal combustion engine. However, their configurations are complicated and impossible to make compact, so there are some problems in mountability to vehicle. In addition, there is still room for improvement in the conventional power output apparatus in that power transmission efficiency should be improved in a wider driving area.

In view of this, an object of the present invention is to provide a power output apparatus and a hybrid vehicle having the same which have simple and compact configurations, and are excellent in mountability. In addition, an object of the present invention is to provide a power output apparatus and a hybrid vehicle having the same capable of improving power transmission efficiency in a wider driving area.

In order to achieve the above object, the power output apparatus and the hybrid vehicle in accordance with the present invention adopt the following means.

The present invention is directed to a power output apparatus for outputting a power to a drive shaft. The power output apparatus includes: an internal combustion engine; a first motor capable of inputting and outputting a power; a second motor capable of inputting and outputting a power; a power distribution and integration mechanism including a first element connected to a rotating shaft of the first motor, a second element connected to a rotating shaft of the second motor, and a third element connected to an engine shaft of the internal combustion engine, the power distribution and integration mechanism configured such that these three elements can be differentially rotated with each other; and a transmission mechanism including a transmission differential rotation mechanism that has an input element connected to one of the first and second elements of the power distribution and integration mechanism, a fixing element, and an output element, the transmission differential rotation mechanism configured such that the input element and the output element can be differentially rotated with each other; and a coupling mechanism capable of selectively coupling the output element of the transmission differential rotation mechanism and the other of the first and second elements of the power distribution and integration mechanism with the drive shaft.

The power output apparatus includes the transmission mechanism that has: the transmission differential rotation mechanism having the input element connected to one of the first and second elements of the power distribution and integration mechanism, the fixing element, and the output element, and configured such that the input element and the output element can be differentially rotated with each other; and the coupling mechanism capable of selectively coupling the output element of the transmission differential rotation mechanism and the other one of the first and second elements of the power distribution and integration mechanism with the drive shaft. The transmission mechanism can be configured with comparatively few components, has a simple and compact configuration, and is excellent in mountability. Further, according to the power output apparatus, when the output element of the transmission differential rotation mechanism is coupled with the drive shaft by the coupling mechanism of the transmission mechanism, a power from one of the first and second elements of the power distribution and integration mechanism can be outputted to the drive shaft after the power has been changed in speed by the transmission differential rotation mechanism. In addition, according to the power output apparatus, when both the output element of the transmission differential rotation mechanism and the other one of the first and second elements of the power distribution and integration mechanism are coupled with the drive shaft by the coupling mechanism of the transmission mechanism, a power from the internal combustion engine can be mechanically (directly) transmitted to the drive shaft at a fixed speed ratio. Furthermore, according to the power output apparatus, when the other one of the first and second elements of the power distribution and integration mechanism is coupled with the drive shaft by the coupling mechanism of the transmission mechanism, it is possible to directly output a power from the relevant other one of the first and second elements to the drive shaft. Thus, according to the transmission mechanism, a power from the power distribution and integration mechanism can be changed in speed in a plurality of stages and outputted to the drive shaft. Moreover, according to the power output apparatus, when the first element of the power distribution and integration mechanism is coupled with the drive shaft by the coupling mechanism of the transmission mechanism, a first motor connected to the first element serving as an output element can be caused to function as a motor and a second motor connected to the second element serving as a reaction element can be caused to function as a generator. Further, when the second element of the power distribution and integration mechanism is coupled with the drive shaft by the coupling mechanism of the transmission mechanism, the second motor connected to the second element serving as an output element can be caused to function as a motor, and the first motor connected to the first element serving as a reaction element can be caused to function as a generator. Therefore, according to the power output apparatus, by using the coupling mechanism to suitably execute switching between the coupling states in order to prevent, in particular, a rotation speed of the second or the first motor functioning as a generator from becoming a negative value when a rotation speed of the first or second motor functioning as a motor has increased, the occurrence of a so-called "power circulation" can be suppressed. As a result, the power output apparatus can favorably improve power transmission efficiency in a wider driving area.

Also, the transmission differential rotation mechanism of the transmission mechanism may be a three-element-type planetary gear mechanism. It is thereby possible to provide the transmission mechanism with a more compact configuration. And the transmission differential rotation mechanism may be a planetary gear mechanism including a first sun gear and a second sun gear having a different number of teeth from that of the first sun gear, and a carrier having at least one stepped gear configured by coupling a first pinion gear that meshes with the first sun gear and a second pinion gear that meshes with the second sun gear. By using this kind of planetary gear mechanism including a stepped gear as a transmission differential rotation mechanism, it is possible to easily set a larger reduction gear ratio.

Further, the first and second motors may be arranged coaxially with the internal combustion engine, and the power distribution and integration mechanism may be arranged coaxially with the first and second motors between the first motor and the second motor. It is thereby possible to provide the overall power output apparatus with a more compact configuration.

As described above, in case the internal combustion engine, the first and second motors, and the power distribution and integration mechanism are arranged coaxially with each other, the power output apparatus according to the present invention may further include: a hollow shaft that is connected to one of the first and second elements of the power distribution and integration mechanism, the hollow shaft also connected to the input element of the transmission differential rotation mechanism; and a coupling shaft that is connected to the other of the first and second elements, the coupling shaft extending through the hollow shaft and the transmission differential rotation mechanism toward the drive shaft. The coupling mechanism of the transmission mechanism may be capable of selectively coupling one of or both of the output element of the transmission differential rotation mechanism and the coupling shaft with said drive shaft. Thus, since a power from the first element and a power from the second element of the power distribution and integration mechanism can be outputted in an approximately coaxial manner and in the same direction, it is possible to arrange the transmission mechanism in an approximately coaxially with the internal combustion engine, the first and second motors, and the power distribution and integration mechanism. Accordingly, this configuration is very suitable for a vehicle that runs by driving mainly the rear wheels thereof.

Also, in case the internal combustion engine, the first and second motors, and the power distribution and integration mechanism are arranged coaxially with each other, the coupling mechanism of the transmission mechanism may include: a transmission shaft that extends approximately parallel to the rotating shafts of the first and second motors, and is connected to the input element of the transmission differential rotation mechanism; a first parallel shaft-type gear train that couples one of the first and second elements of the power distribution and integration mechanism with the transmission shaft; a second parallel shaft-type gear train that is coupled with the other of the first and second elements; and a switching mechanism capable of selectively switching between a first coupling state in which the transmission shaft and the drive shaft are coupled, a second coupling state in which the second parallel shaft-type gear train and the drive shaft are coupled, and a third coupling state in which both of the transmission shaft and the second parallel shaft-type gear train are coupled with the drive shaft. When the coupling mechanism of the transmission mechanism includes the aforementioned transmission shaft, the two parallel shaft-type gear trains, and the switching mechanism as described above, it is possible to configure the power output apparatus as a two-shaft type apparatus by arranging the switching mechanism and the transmission differential rotation mechanism around the transmission shaft so as to be coaxial therewith, and even if the internal combustion engine, the first and second motors, and the power distribution and integration mechanism are arranged in an approximately coaxial manner, an increase in the axial direction (width direction dimensions) of the power output apparatus can be suppressed. Accordingly, the power output apparatus is compact and excellent in mountability, and is very suitable for a vehicle that runs mainly by driving the front wheels thereof. Further, coupling the first or second element of the power distribution and integration mechanism with the transmission shaft through the parallel shaft-type gear trains makes it also possible to freely set a speed ratio between the first element or second element and the transmission shaft.

Further, the power output apparatus according to the present invention may further include a fixing mechanism capable of non-rotatably fixing one of the rotating shaft of the first motor and the rotating shaft of the second motor. Thus, when the first or second element of the power distribution and integration mechanism that is connected to the first motor or the second motor that does not correspond to the fixing mechanism is coupled with the drive shaft by the coupling mechanism of the transmission mechanism, by using the fixing mechanism to non-rotatably fix the rotating shaft of the second motor or the first motor corresponding to the fixing mechanism, a power from the internal combustion engine can be mechanically (directly) transmitted to the drive shaft at a fixed speed ratio. Therefore, the power output apparatus can favorably improve power transmission efficiency in a wider driving area.

Also, the power output apparatus according to the present invention may further include a connection/disconnection mechanism capable of performing any of a connection and a release of the connection between the first motor and the first element; a connection and a release of the connection between the second motor and the second element; and a connection and a release of the connection between the internal combustion engine and the third element. According to the power output apparatus having such a connection/disconnection mechanism, causing the connection/disconnection mechanism to release the aforementioned connection allows a function of the power distribution and integration mechanism to substantially disconnect the internal combustion engine from the first and second motors and the transmission mechanism. This allows the power output apparatus to cause the connection/disconnection mechanism to release the above connection and stop the internal combustion engine. Thereby, the power from at least one of the first and the second motors can be effectively transmitted to the drive shaft by using the transmission mechanism to change the speed of the power. Therefore, the power output apparatus can reduce the maximum torque and the like demanded by the first and second motors, and thus, further miniaturize the first and second motors.

Further, one element among the first and second elements of the power distribution and integration mechanism into which a larger torque is inputted from the third element connected to the engine shaft may be connected to the first motor or the second motor through a reduction mechanism that reduces rotations of a rotating shaft of the first motor or the second motor. Thus, when the element for which the distribution ratio of torque from the internal combustion engine is larger among the first and second elements of the power distribution and integration mechanism is connected to the first or second motor via the reduction mechanism, it is possible to more effectively decrease a torque load of the first or second motor that is connected to the reduction mechanism, and miniaturize the relevant motor and reduce the power loss thereof.

In this case, the power distribution and integration mechanism may be a double pinion planetary gear mechanism including a sun gear, a ring gear, and a carrier which holds at least one pair of two pinion gears that mesh with each other and one of which meshes with the sun gear and the other of which meshes with the ring gear, and in which the first element is one of the sun gear and the carrier, the second element is the other of the sun gear and the carrier, and the third element is the ring gear. And, the power distribution and integration mechanism may be configured such that, when a gear ratio of the power distribution and integration mechanism that is a value calculated by dividing the number of teeth of the sun gear by a number of teeth of the ring gear is taken as $\rho$, $\rho<0.5$; and in which the reduction mechanism may be configured such that a reduction gear ratio becomes a value that is close to $\rho/(1-\rho)$, the reduction mechanism arranged between the first motor or the second motor and the carrier. According to the power distribution and integration mechanism having such specifications, the distribution ratio of torque from the internal combustion engine is larger for the carrier than for the sun gear. Accordingly, by disposing the reduction mechanism between the carrier and the first or second motor, it is possible to miniaturize the relevant first or second motor and reduce the power loss thereof. Further, by making the reduction gear ratio of the reduction mechanism a value that is close to $\rho/(1-\rho)$, it is possible to make the specifications of the first and second motors approximately identical. It is thereby possible to improve productivity with respect to the power output apparatus and also reduce costs. Further, the power distribution and integration mechanism which is a double pinion planetary gear mechanism may be configured such that, when a gear ratio of the power distribution and integration mechanism that is a value calculated by dividing a number of teeth of the sun gear by the number of teeth of the ring gear is taken as $\rho$, $\rho>0.5$; and in this case, the reduction mechanism may be configured such that a reduction gear ratio becomes a value that is close to $(1-\rho)/\rho$, the reduction mechanism may be arranged between the first motor or the second motor and the sun gear.

Also, the power distribution and integration mechanism may be a single pinion planetary gear mechanism including a sun gear, a ring gear, and a carrier which holds at least one pinion gear that meshes with both of the sun gear and the ring gear, in which the first element may be one of the sun gear and the ring gear, the second element may be the other of the sun gear and the ring gear, and the third element may be the carrier; and in which the reduction mechanism is configured so as to have a reduction gear ratio which is close to a gear ratio $\rho$ of the power distribution and integration mechanism that is a value calculated by dividing a number of teeth of the sun gear by a number of teeth of the ring gear, the reduction mechanism may be arranged between the first or second motor and the ring gear. According to the power distribution and integration mechanism having such specifications, the distribution ratio of torque from the internal combustion engine is larger for the ring gear than for the sun gear. Accordingly, by disposing the reduction mechanism between the ring gear and the first or second motor, it is possible to miniaturize the relevant first or second motor and reduce the power loss thereof. Further, by making the reduction gear ratio of the reduction mechanism a value that is close to $\rho$, it is possible to make the specifications of the first and second motors approximately identical. It is thereby possible to improve productivity with respect to the power output apparatus and also reduce costs.

The present invention is directed to a hybrid vehicle. The hybrid vehicle includes any one of power output apparatus described above, and includes drive wheels driven by a power from the drive shaft. Since the power output apparatus mounted in the hybrid vehicle is simple and compact with excellent mountability, and can improve power transmission efficiency over a wider driving area, the hybrid vehicle can favorably improve fuel consumption and drive performance.

BRIEF DESCRIPTION OF THE DRAWINGS

FIG. 6 is a chart that illustrates setting states of a clutch position of a clutch C0, and a clutch C1 of a transmission 60 when a hybrid vehicle 20 according to one embodiment is running;

FIG. 11 is a chart that illustrates setting states of clutch positions and the like of a clutch C0', a brake B0, and clutches C1a, C1b of a transmission 60A when a hybrid vehicle 20A according to a modification example is running;

BEST MODE FOR CARRYING OUT THE INVENTION

Hereinafter, the best mode for carrying out the invention will be described with reference to embodiments.

Figure 1:
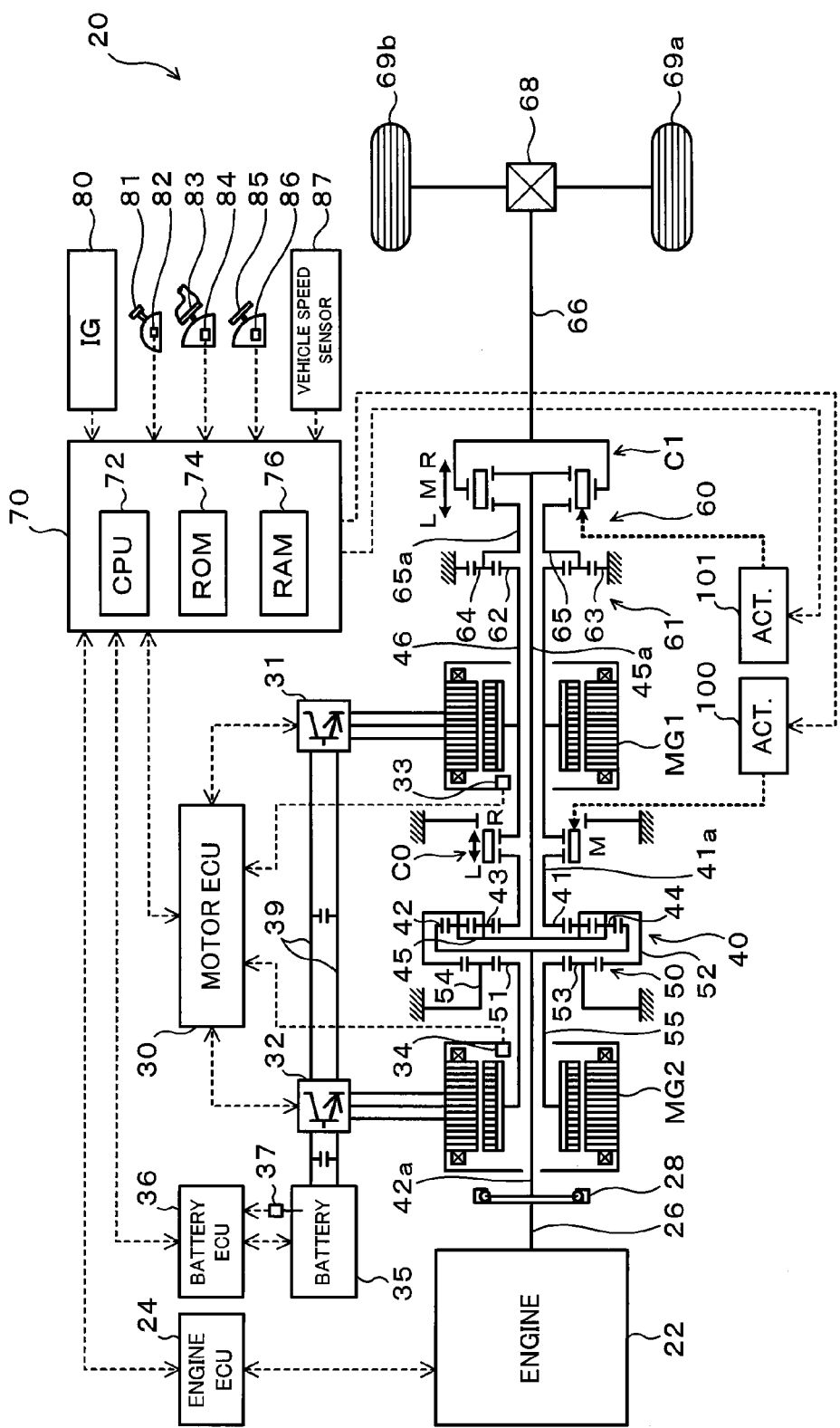
FIG. 1 is a schematic configuration view of a hybrid vehicle 20 in accordance with an embodiment of the present invention.

FIG. 1 is a schematic configuration view of a hybrid vehicle 20 in accordance with a present embodiment of the present invention. The hybrid vehicle 20 shown in the same figure is configured as a rear-wheel-drive vehicle, and includes an engine 22 arranged in a vehicle front portion; a power distribution and integration mechanism (differential rotation mechanism) 40 connected to a crankshaft 26 which is an output shaft of the engine 22; a generatable motor MG1 connected to the power distribution and integration mechanism 40; a generatable motor MG2 arranged coaxially with the motor MG1 and connected to the power distribution and integration mechanism 40 through a reduction gear mechanism 50; a transmission 60 capable of transmitting power from the power distribution and integration mechanism 40 to a drive shaft 66 with a change in speed ratio; and a hybrid electronic control unit (hereinafter referred to as "hybrid ECU") 70 for controlling the entire hybrid vehicle 20 and the like.

The engine 22 is an internal combustion engine which outputs power by receiving a supply of a hydrocarbonaceous fuel such as gasoline and a diesel oil, and receives control of a fuel injection amount, an ignition timing, an intake air amount, and the like from an engine electronic control unit (hereinafter referred to as "engine ECU") 24. The engine ECU 24 receives signals from various kinds of sensors which are provided with respect to the engine 22 and detect an operating state of the engine 22. Moreover, the engine ECU 24 communicates with the hybrid ECU 70, controls the operation of the engine 22 based on control signals from the hybrid ECU 70 and signals from the above sensors, and outputs data about the operating state of the engine 22 to the hybrid ECU 70 as needed.

Each of the motor MG1 and the motor MG2 is configured as a known synchronous generator/motor which can operate not only as a generator, but also as a motor; and supplies and receives electric power to and from a battery 35 which is a secondary battery through inverters 31 and 32. Power lines 39 connecting the inverters 31 and 32 and the battery 35 are configured as a positive electrode bus line and a negative electrode bus line shared by the individual inverters 31 and 32; and are configured such that the power generated by one of the motors MG1 and MG2 can be consumed by the other motor. Therefore, the battery 35 is charged with electric power generated by one of the motors MG1 and MG2 and is discharged due to electric power shortage. If the electric power consumption and generation is balanced between the motors MG1 and MG2, the battery 35 is assumed to be neither charged nor discharged. Both the motors MG1 and MG2 are drive-controlled by a motor electronic control unit (hereinafter referred to as "motor ECU") 30. The motor ECU 30 receives a signal necessary for drive-controlling the motors MG1 and MG2, for example, a signal from rotational position detection sensors 33 and 34 for detecting a rotational position of a rotor of motors MG1 and MG2; and a phase current which is detected by a current sensor (not shown) and is applied to the motors MG1 and MG2. The motor ECU 30 outputs a switching control signal to inverters 31 and 32 and the like. The motor ECU 30 executes a rotation speed calculation routine (not shown) based on a signal inputted from the rotational position detection sensors 33 and 34, and calculates the rotation speeds Nm1 and Nm2 of rotors of the motors MG1 and MG2. Moreover, the motor ECU 30 communicates with the hybrid ECU 70, drive-controls the motors MG1 and MG2 based on control signals from the hybrid ECU 70, and outputs data about the operating states of the motors MG1 and MG2 to the hybrid ECU 70 as needed.

The battery 35 is managed by a battery electronic control unit (hereinafter referred to as "battery ECU" 36. The battery ECU 36 receives a signal necessary for managing the battery 35, for example, an inter-terminal voltage from a voltage sensor (not shown) provided between the terminals of the battery 35; a charge-discharge current from a current sensor (not shown) provided on the power line 39 connected to an output terminal of the battery 35; a battery temperature Tb from a temperature sensor 37 attached to the battery 35, and the like. The battery ECU 36 outputs data about a state of the battery 35 to the hybrid ECU 70 and the engine ECU 24 through communication as needed. Further, the battery ECU 36 calculates a state of charge (SOC) based on an integrated value of charge and discharge currents detected by the current sensor in order to manage the battery 35.

The power distribution and integration mechanism 40 is housed in a transmission case (not shown) together with the motors MG1 and MG2, the reduction gear mechanism 50, and the transmission 60, and is arranged coaxially with the crankshaft 26 spaced at a predetermined distance from the engine 22. The power distribution and integration mechanism 40 of the present embodiment is a double pinion planetary gear mechanism that includes a sun gear 41 which is an external gear; a ring gear 42 which is an internal gear arranged concentrically with the sun gear 41; and a carrier 45 which rotatably and spinably holds at least one pair of two pinion gears 43 and 44 meshed with each other, one of which is meshed with the sun gear 41 and the other of which is meshed with the ring gear 42; and is configured such that the sun gear 41 (first element), the ring gear 42 (third element), and the carrier 45 (second element) can differentially rotate with each other. According to the present embodiment, the power distribution and integration mechanism 40 is configured such that the gear ratio $\rho$ (value obtained by dividing the number of teeth of the sun gear 41 by the number of teeth of the ring gear 42) thereof is $\rho<0.5$. The motor MG1 (hollow rotor) serving as the first motor is connected to the sun gear 41 which is a first element of the power distribution and integration mechanism 40 through a hollow first motor shaft 46 and a hollow sun gear shaft 41a constituting a series of hollow shafts extending from the sun gear 41 to an opposite side (rear part of the vehicle) of the engine 22. Moreover, the motor MG2 (hollow rotor) serving as the second motor is connected to the carrier 45 which is the second element through the reduction gear mechanism 50 provided between the power distribution and integration mechanism 40 and the engine 22 and a hollow second motor shaft (second shaft) 55 extending toward the engine 22 from the reduction gear mechanism 50 (sun gear 51). Further, the crankshaft 26 of the engine 22 is connected to the ring gear 42 which is a third element through a damper 28 and the ring gear shaft 42a extending through the second motor shaft 55 and the motor MG2.

The reduction gear mechanism 50 is a single pinion planetary gear mechanism having a sun gear 51 which is an external gear; a ring gear 52 which is an internal gear arranged concentrically with the sun gear 51; a plurality of pinion gears 53 which are meshed with both the sun gear 51 and the ring gear 52; and a carrier 54 which rotatably and spinably holds the plurality of pinion gears 53. In the present embodiment, the reduction gear mechanism 50 is configured such that a reduction gear ratio (number of teeth of the sun gear 51/number of teeth of the ring gear 52) thereof becomes, when the gear ratio of the power distribution and integration mechanism 40 is taken as $\rho$, a value that is close to $\rho/(1-\rho)$. The sun gear 51 of the reduction gear mechanism 50 is connected to a rotor of the motor MG2 through the above described second motor shaft 55. Moreover, the ring gear 52 of the reduction gear mechanism 50 is fixed to the carrier 45 of the power distribution and integration mechanism 40. Thereby, the reduction gear mechanism 50 is substantially integrated with the power distribution and integration mechanism 40. The carrier 54 of the reduction gear mechanism 50 is fixed with respect to the transmission case. Therefore, by operation of the reduction gear mechanism 50, the power from the motor MG2 is reduced in speed and is inputted to the carrier 45 of the power distribution and integration mechanism 40; and at the same time, the power from the carrier 45 is increased in speed and is inputted to the motor MG2. It should be noted that as shown in the present embodiment, the power output apparatus can be made more compact by placing the reduction gear mechanism 50 between the motor MG2 and the power distribution and integration mechanism 40 so as to be formed integrally with the power distribution and integration mechanism 40.

Moreover, as shown in FIG. 1, a clutch C0 that functions as a connection/disconnection mechanism is provided between the sun gear shaft 41a and the first motor shaft 46 so as to perform a connection and a release of the connection therebetween, and the clutch C0 also functions as a fixing mechanism that is capable of non-rotatably fixing the first motor shaft 46 (sun gear 41) which is the rotating shaft of the motor MG1. According to the present embodiment, the clutch C0 is configured, for example, as a dog clutch that includes a dog that is fixed to a leading end (right end in the figure) of the sun gear shaft 41a, a dog fixed to one end (left end in the figure) of the first motor shaft 46, a fixing dog that is fixed to the transmission case, and an engagement member that is capable of meshing with these dogs and that is driven by an electric, electromagnetic, or hydraulic actuator 100. As shown in FIG. 1, the clutch position as the position of the engagement member can be selectively switched between an "L position", an "M position", and an "R position". More specifically, when the clutch position of the clutch C0 of the present embodiment is set to the L position, a connection between the dog of the sun gear shaft 41a and the dog of the first motor shaft 46 through the engagement member, that is, the connection between the motor MG1 and the sun gear 41 of the power distribution and integration mechanism 40, is released. When the clutch C0 releases the connection between the sun gear shaft 41a and the first motor shaft 46 in this manner, the connection between the motor MG1 serving as the first motor and the sun gear 41 which is a first element of the power distribution and integration mechanism 40 is released. In short, a function of the power distribution and integration mechanism 40 can substantially disconnect the engine 22 from the motors MG1 and MG2 and the transmission 60. Further, when the clutch position of the clutch C0 is set to the M position, the dog of the sun gear shaft 41a and the dog of the first motor shaft 46 are connected with less loss through the engagement member, and thereby the motor MG1 and the sun gear 41 of the power distribution and integration mechanism 40 are connected. Furthermore, when the clutch position of the clutch C0 is set to the R position, the dog of the sun gear shaft 41a, the dog of the first motor shaft 46, and the fixing dog are connected with less loss through the engagement member, and it is thereby possible to non-rotatably fix the sun gear 41 which is the first element of the power distribution and integration mechanism 40 or the first motor shaft 46 (motor MG1).

As described above, the first motor shaft 46 which can be coupled to the sun gear 41 of the power distribution and integration mechanism 40 through the clutch C0 further extends from the motor MG1 to an opposite side (rear part of the vehicle) of the engine 22, and is connected to the transmission 60. Moreover, a carrier shaft (coupling shaft) 45a extends from the carrier 45 of the power distribution and integration mechanism 40 to an opposite side (rear part of the vehicle) of the engine 22 through the hollow sun gear shaft 41a and the first motor shaft 46, and the carrier shaft 45a can also be connected to the transmission 60. Thereby, according to the present embodiment, the power distribution and integration mechanism 40 is provided between the motors MG1 and MG2 which are arranged coaxially with each other, and is arranged coaxially with both the motors MG1 and MG2; and the engine 22 is arranged coaxially with the motor MG2 and faces the transmission 60 with the power distribution and integration mechanism 40 therebetween. That is, according to the present embodiment, the components of the power output apparatus such as the engine 22, the motors MG1 and MG2, the power distribution and integration mechanism 40, and the transmission 60 are arranged approximately coaxially with each other starting with the engine 22, the motor MG2 (reduction gear mechanism 50), the power distribution and integration mechanism 40, the motor MG1, and the transmission 60 in that order starting at the front part of the vehicle. This allows the power output apparatus to be compact in size, excellent in mountability, preferable for the hybrid vehicle 20 which runs mainly by driving rear wheels.

The transmission 60 includes a transmission differential rotation mechanism 61 that is a single pinion planetary gear mechanism (reduction mechanism) capable of reducing in speed an inputted power according to a predetermined reduction gear ratio and outputting the resulting power, and a clutch C1 that serves as a coupling mechanism. The transmission differential rotation mechanism 61 includes a sun gear 62 which is an input element, a ring gear 63 which is a fixing element arranged concentrically with the sun gear 62, and a carrier 65 which is an output element that holds a plurality of pinion gears 64 which are meshed with both the sun gear 62 and the ring gear 63, and is configured such that the sun gear 62 and the carrier 65 can differentially rotate with each other. As shown in FIG. 1, the sun gear 62 of the transmission differential rotation mechanism 61 is connected to the first motor shaft 46. The ring gear 63 of the transmission differential rotation mechanism 61 is non-rotatably fixed with respect to the transmission case. Further, a hollow carrier shaft 65a that extends towards the rear part of the vehicle is connected to the carrier 65 of the transmission differential rotation mechanism 61. A carrier shaft 45a extending from the carrier 45 which is a second element of the power distribution and integration mechanism 40 passes through the first motor shaft 46 and the carrier shaft 65a.

The clutch C1 enables selective coupling to the drive shaft 66 of either one of or both of the carrier 65 (carrier shaft 65a) which is the output element of the transmission differential rotation mechanism 61, and the carrier 45 (carrier shaft 45a) which is the second element of the power distribution and integration mechanism 40. More specifically, according to the present embodiment, the clutch C1 is configured, for example, as a dog clutch that includes a dog fixed to a leading end (right end in the figure) of the carrier shaft 65a connected to the carrier 65 of the transmission differential rotation mechanism 61, a dog fixed to a leading end (right end in the figure) of a carrier shaft 45a that protrudes from a distal end of the transmission differential rotation mechanism 61, namely, the carrier shaft 65a, a dog attached to the drive shaft 66 so as to be positioned at the periphery of the dog of the carrier shaft 65a and the dog of the carrier shaft 45a, and an engagement member that is capable of meshing with these dogs and that is driven by an electric, electromagnetic, or hydraulic actuator 101. As shown in FIG. 1, the clutch position as the position of the engagement member can be selectively switched between an "L position", an "M position", and an "R position". More specifically, when the clutch position of the clutch C1 of the transmission 60 is set to the L position, the dog of the carrier shaft 65a connected to the carrier 65 which is the output element of the transmission differential rotation mechanism 61 and the dog of the drive shaft 66 are coupled with less loss through the engagement member. Therefore, when the clutch C0 is connected, the sun gear 41 which is the first element of the power distribution and integration mechanism is coupled with the drive shaft 66 through the sun gear shaft 41a, the first motor shaft 46, the transmission differential rotation mechanism 61, and the clutch C1 (hereunder, as appropriate, this state of coupling by the clutch C1 is referred to as "first coupling state"). Further, when the clutch position of the clutch C1 is set to the M position, the dog of the carrier shaft 65a, the dog of the carrier shaft 45a from the carrier 45 which is the second element of the power distribution and integration mechanism 40, and the dog of the drive shaft 66 are connected with less loss through the engagement member, and thereby both the carrier shaft 65a and the carrier shaft 45a are connected to the drive shaft 66. More specifically, in this case, when the clutch C0 is connected, the sun gear 41 of the power distribution and integration mechanism 40 is coupled with the drive shaft 66 by the clutch C1 through the transmission differential rotation mechanism 61, and the carrier 45 of the power distribution and integration mechanism 40 is also directly coupled with the drive shaft 66 (hereunder, as appropriate, this state of coupling by the clutch C1 is referred to as "third coupling state"). Furthermore, when the clutch position of the clutch C1 is set to the R position, the dog of the carrier shaft 45a and the dog of the drive shaft 66 are coupled with less loss through the engagement member, and thereby the carrier 45 which is the second element of the power distribution and integration mechanism 40 and the drive shaft 66 are coupled through the carrier shaft 45a and the clutch C1 (hereunder, as appropriate, this state of coupling by the clutch C1 is referred to as "second coupling state"). It should be noted that, as shown in FIG. 1, the drive shaft 66 is connected to rear wheels 69a and 69b as drive wheels through a differential gear 68.

The hybrid ECU 70 is configured as a microprocessor around a CPU 72, and in addition to the CPU 72, includes a ROM 74 for storing a processing program; a RAM 76 for temporarily storing data; an input/output port (not shown); and a communication port (not shown). The hybrid ECU 70 receives an ignition signal from an ignition switch (start switch) 80; a shift position SP from a shift position sensor 82 for detecting the shift position SP which is an operation position of a shift lever 81; an accelerator opening Acc from an accelerator pedal position sensor 84 for detecting the amount of depression of an accelerator pedal 83; a brake pedal position BP from a brake pedal position sensor 86 for detecting the amount of depression of a brake pedal 85; and a vehicle speed V from a vehicle speed sensor 87 through the input port. As described above, the hybrid ECU 70 is connected to the engine ECU 24, the motor ECU 30, and the battery ECU 36 through a communication port, and sends and receives various kinds of control signals and data to and from the engine ECU 24, the motor ECU 30, and the battery ECU 36. Moreover, the hybrid ECU 70 also controls the actuator 100, 101 which drive the brake B0, the clutch C0, and the clutch C1 of the transmission 60.

Next, the operation of the hybrid vehicle 20 of the present embodiment will be described referring to FIGS. 2 to 9.

FIGS. 2 to 5 are explanatory drawings, each showing a relationship of a rotation speed and a torque of major elements of the power distribution and integration mechanism 40 and the transmission 60 when the speed ratio of the transmission 60 is changed in a shift up direction according to a vehicle speed change when the hybrid vehicle 20 runs with an operation of the engine 22. FIG. 6 is a chart that illustrates setting states of the clutch position of the clutch C0 or the clutch C1 of the transmission 60 when running the hybrid vehicle 20. When the hybrid vehicle 20 runs in a state shown in FIGS. 2 to 5, under the overall control of the hybrid ECU 70 based on the amount of depression of the accelerator pedal 83 and the vehicle speed V, the engine ECU 24 controls the engine 22, the motor ECU 30 controls the motors MG1 and MG2, and the hybrid ECU 70 directly controls the actuators 100 and 101 (clutch C0, and the clutch C1 of the transmission 60). It should be noted that with reference to FIGS. 2 to 5, the S axis indicates a rotation speed (rotation speed Nm1 of the motor MG1, namely, the first motor shaft 46) of the sun gear 41 of the power distribution and integration mechanism 40, the R axis indicates a rotation speed (rotation speed Ne of the engine 22) of the ring gear 42 of the power distribution and integration mechanism 40, and the C axis indicates a rotation speed (rotation speed of the ring gear 52 of the reduction gear mechanism 50 or the carrier shaft 45a) of the carrier 45 of the power distribution and integration mechanism 40, respectively. Further, the 54 axis indicates a rotation speed of the carrier 54 of the reduction gear mechanism 50, and the 51 axis indicates a rotation speed (rotation speed Nm2 of the motor MG2, namely, the second motor shaft 55) of the sun gear 51 of the reduction gear mechanism 50, respectively. Furthermore, the 62 axis indicates a rotation speed of the sun gear 62 of the transmission differential rotation mechanism 61 of the transmission 60, the 65 axis and the 66 axis indicate a rotation speed of the carrier 65 of the transmission differential rotation mechanism 61 and the drive shaft 66, and the 63 axis indicates a rotation speed of the ring gear 63 of the transmission differential rotation mechanism 61, respectively.

Figure 2:
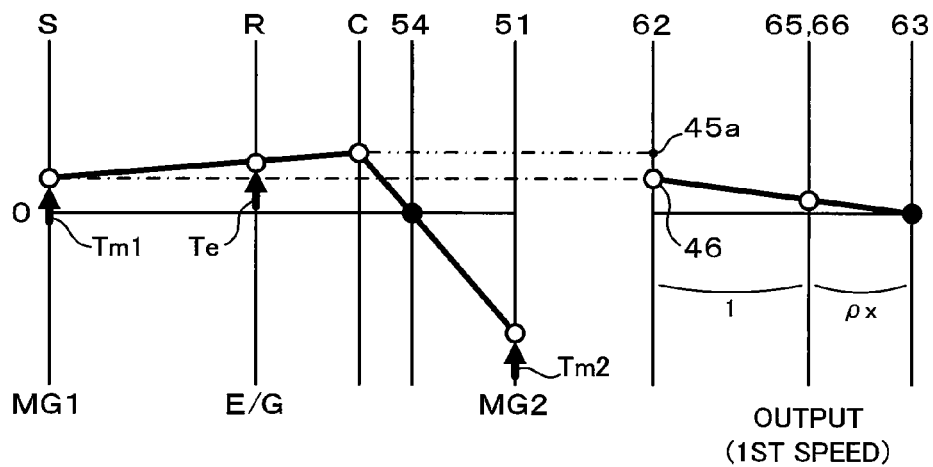
FIG. 2 is an explanatory drawing illustrating a relationship of a rotation speed and a torque of major elements of a power distribution and integration mechanism 40 and a transmission 60 when the speed ratio of the transmission 60 is changed in a shift up direction according to the speed change of the vehicle when the hybrid vehicle 20 of the present embodiment runs with an operation of an engine 22.
Figure 7:
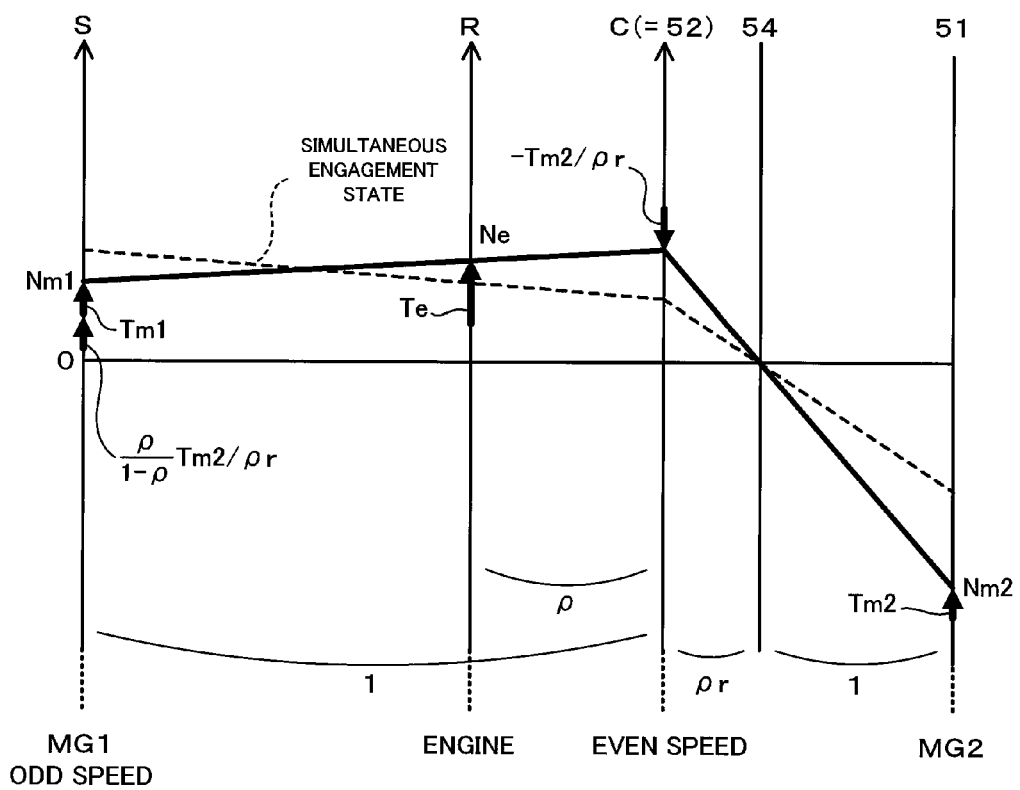
FIG. 7 is an explanatory drawing showing an example of an alignment chart representing a relationship of a rotation speed and a torque between an individual element of the power distribution and integration mechanism 40 and an individual element of the reduction gear mechanism 50 when the motor MG2 functions as a generator and the motor MG1 functions as a motor.

When the hybrid vehicle 20 runs accompanying operation of the engine 22, basically the clutch C0 is set to the M position and the motor MG1, namely, the first motor shaft 46, is connected to the sun gear 41 of the power distribution and integration mechanism 40 through the sun gear shaft 41a. Subsequently, the clutch C1 of the transmission 60 is set to the L position (see FIG. 6) when the vehicle speed V of the hybrid vehicle 20 is relatively low. Hereunder, this state is referred to as "first speed state (1st speed)" of the transmission 60 (FIG. 2). In the first speed state, the sun gear 41 which is the first element of the power distribution and integration mechanism 40 is connected to the drive shaft 66 through the sun gear shaft 41a, the first motor shaft 46, the transmission differential rotation mechanism 61, and the clutch C1. Thus, in the first speed state, it is possible for the sun gear 41 of the power distribution and integration mechanism 40 to become an output element and drive and control the motors MG1 and MG2 so that the motor MG1 connected through the clutch C0 and the like to the sun gear 41 functions as a motor, and the motor MG2 connected to the carrier 45 that serves as a reaction element functions as a generator. In this case, the power distribution and integration mechanism 40 receives a power from the engine 22 through the ring gear 42 and distributes the power to the sun gear 41 side and the carrier 45 side according to the gear ratio ρ, and integrates the power from the engine 22 and the power from the motor MG1 functioning as a motor and outputs the integrated power to the sun gear 41 side. Hereinafter, the mode in which the motor MG1 functions as a motor and the motor MG2 functions as a generator is referred to as "first torque conversion mode". FIG. 7 shows an example of an alignment chart representing a relationship of a rotation speed and a torque between an individual element of the power distribution and integration mechanism 40 and an individual element of the reduction gear mechanism 50 in the first torque conversion mode. It should be noted that in FIG. 7, the S axis, the R axis, the C axis, the 54 axis, and the 51 axis denote like elements shown in FIGS. 2 to 5, ρ denotes a gear ratio of the power distribution and integration mechanism 40, and ρr denotes a reduction gear ratio of the reduction gear mechanism 50, respectively. Further, in FIG. 7, a thick arrow indicates torque acting on an individual element. An upward arrow in the figure indicates that the value of the torque is positive, and a downward arrow in the figure indicates that the value of the torque is negative (same as in FIGS. 2 to 5, and FIGS. 8 and 9). In the first torque conversion mode, the power distribution and integration mechanism 40 and the motors MG1 and MG2 perform a torque conversion on a power from the engine 22 and output the power to the sun gear 41; and the ratio between the rotation speed of the engine 22 and the rotation speed of the sun gear 41 which is the output element can be changed steplessly and continuously by controlling the rotation speed of the motor MG2. The power outputted to the sun gear 41 is transmitted to the sun gear 62 of the transmission differential rotation mechanism 61 through the sun gear shaft 41a and the first motor shaft 46, and after being subjected to a speed change (reduction) at a speed ratio ($\rho x/(1+\rho x)$) based on a gear ratio ρx (see FIG. 2) of the transmission differential rotation mechanism 61, the power is outputted to the drive shaft 66.

Figure 3:
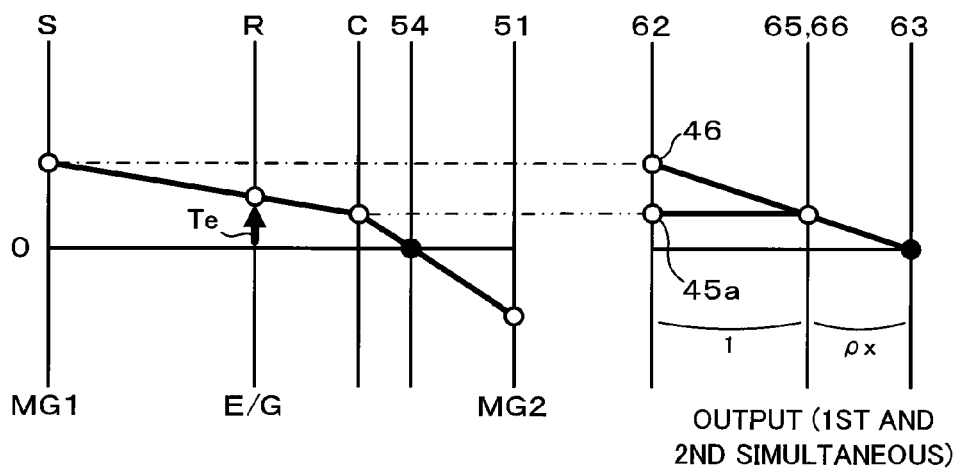
FIG. 3 is an explanatory drawing similar to FIG. 2.

In the state shown in FIG. 2, more specifically, in a state in which the transmission 60 is in the first speed state and the torque conversion mode is the first torque conversion mode, when the vehicle speed V of the hybrid vehicle 20 increases, before long the rotation speed of the carrier 45 of the power distribution and integration mechanism 40 and the rotation speed of the drive shaft 66 (carrier shaft 65a) approximately match each other. As a result, it is possible to set the clutch C1 of the transmission 60 to the M position to connect the dog (transmission differential rotation mechanism 61) of the carrier shaft 65a, the dog of the carrier shaft 45a, and the dog of the drive shaft 66, and couple both the sun gear 41 and the carrier 45 of the power distribution and integration mechanism 40 with the drive shaft 66. In a state in which the clutch C1 of the transmission 60 is set to the M position, if each of the torque commands to the motors MG1 and MG2 is set to a value of 0, as shown in FIG. 3, the motors MG1 and MG2 are idle without performing power operation or regenerative operation, and a power (torque) from the engine 22 can be transmitted mechanically (directly) to the drive shaft 66 without conversion to electrical energy at a fixed (constant) speed ratio (a speed ratio between the first speed state and a second speed state that is described later). Hereinafter, a mode in which both the carrier 45 and sun gear 41 of the power distribution and integration mechanism 40 are coupled with the drive shaft 66 by the clutch C1 is referred to as "simultaneous engagement mode". In particular, the state shown in FIG. 3 is referred to as a "1st and 2nd speed simultaneous engagement state".

Figure 4:
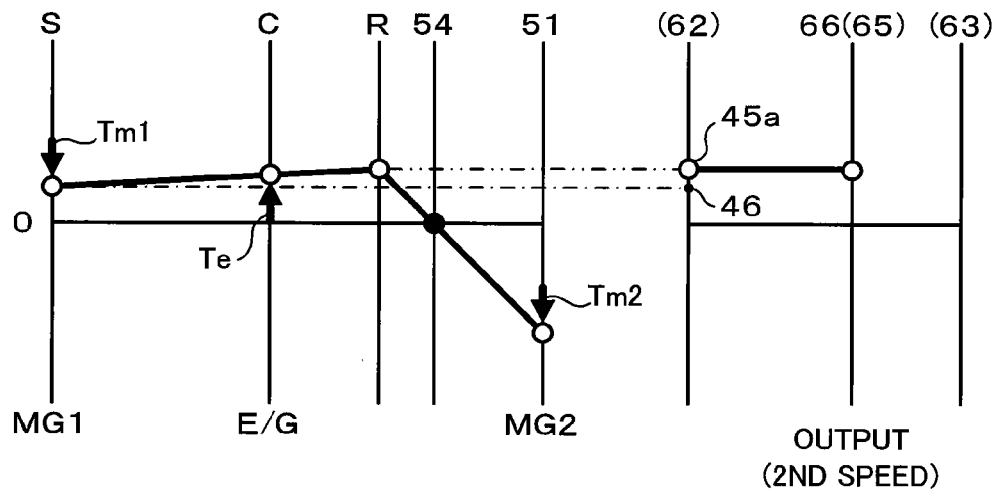
FIG. 4 is an explanatory drawing similar to FIG. 2.
Figure 8:
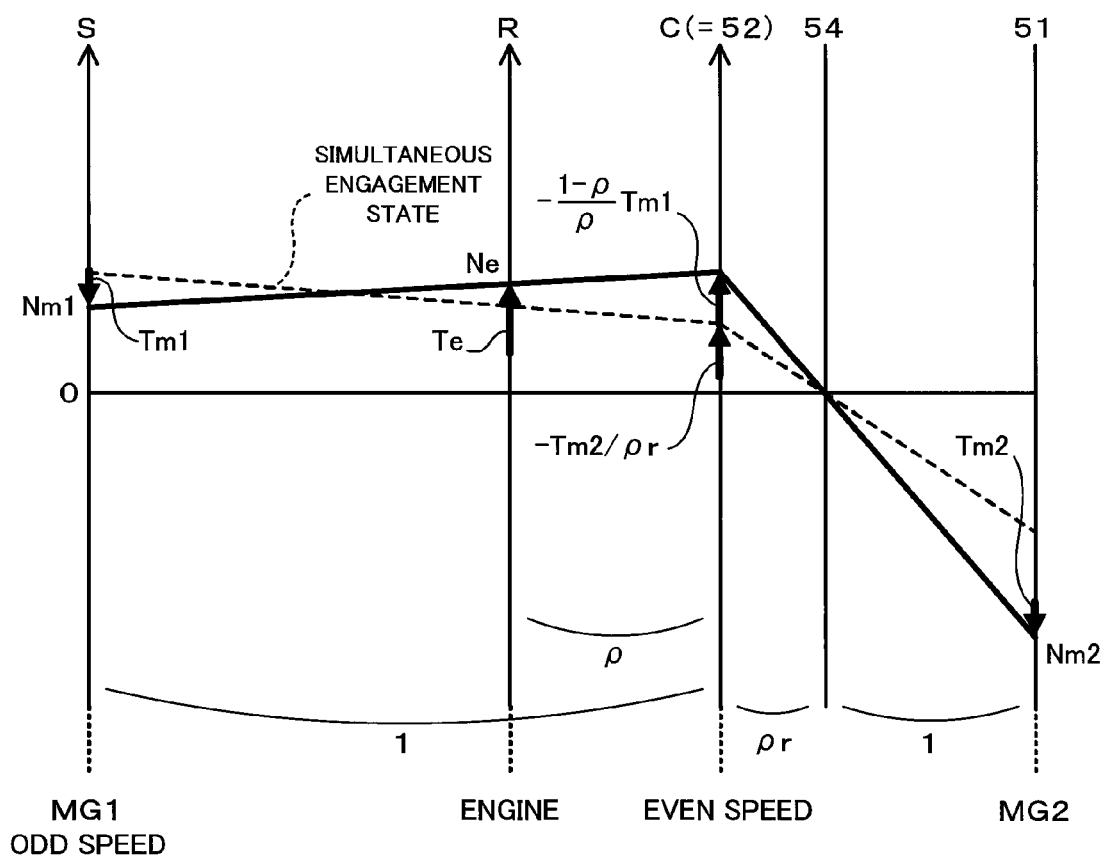
FIG. 8 is an explanatory drawing showing an example of an alignment chart representing a relationship of a rotation speed and a torque between an individual element of the power distribution and integration mechanism 40 and an individual element of a reduction gear mechanism 50 when a motor MG1 functions as a generator and a the motor MG2 functions as a motor.

In the 1st and 2nd speed simultaneous engagement state shown in FIG. 3, because the rotation speeds of the carrier shaft 65a and the carrier shaft 45a are matching, the clutch position of the clutch C1 of the transmission 60 can be easily switched from the M position to the R position to release the connection between the carrier shaft 65a (transmission differential rotation mechanism 61) and the drive shaft 66. Hereinafter, a state in which the clutch C0 is set to the M position and the clutch C1 is set to the R position is referred to as a "second speed state (2nd speed)" of the transmission 60 (FIG. 4). In the second speed state, the carrier 45 which is the second element of the power distribution and integration mechanism 40 is coupled with the drive shaft 66 through the carrier shaft 45a and the clutch C1. Thus, in the second speed state, it is possible for the carrier 45 of the power distribution and integration mechanism 40 to become an output element and drive and control the motors MG1 and MG2 so that the motor MG2 connected to the carrier 45 functions as a motor, and the motor MG1 connected to the sun gear 41 that serves as a reaction element functions as a generator. In this case, the power distribution and integration mechanism 40 receives a power from the engine 22 through the ring gear 42 and distributes the power to the sun gear 41 side and the carrier 45 side according to the gear ratio ρ, and integrates the power from the engine 22 and the power from the motor MG2 functioning as a motor and outputs the integrated power to the carrier 45 side. Hereinafter, the mode in which the motor MG2 functions as a motor and the motor MG1 functions as a generator in this manner is referred to as "second torque conversion mode". FIG. 8 shows an example of an alignment chart representing a relationship of a rotation speed and a torque between an individual element of the power distribution and integration mechanism 40 and an individual element of the reduction gear mechanism 50 in the second torque conversion mode. It should be noted that the reference characters in FIG. 8 are the same as in FIG. 7. In the second torque conversion mode, the power from the engine 22 is subjected to torque conversion by the power distribution and integration mechanism 40 and the motors MG1 and MG2 and is outputted to the carrier 45; and the ratio between the rotation speed of the engine 22 and the rotation speed of the carrier 45 which is the output element can be changed steplessly and continuously by controlling the rotation speed of the motor MG1. The power outputted to the carrier 45 is subsequently outputted directly to the drive shaft 66 through the carrier shaft 45a and the clutch C1.

Figure 5:
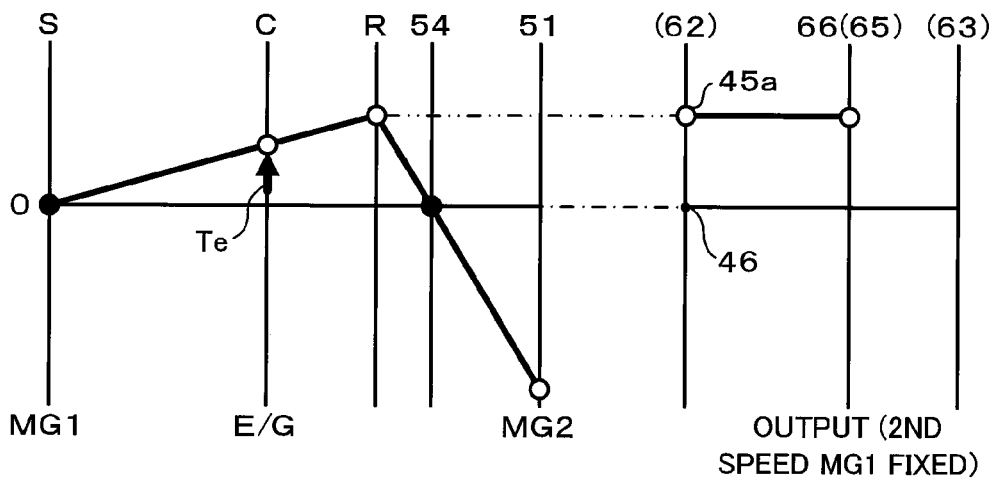
FIG. 5 is an explanatory drawing similar to FIG. 2.

In the state shown in FIG. 4, more specifically, in a state in which the transmission 60 is in the second speed state and the torque conversion mode is the second torque conversion mode, when the vehicle speed V of the hybrid vehicle 20 increases, before long the rotation speeds of the motor MG1, the first motor shaft 46, and the sun gear 41 which is the first element of the power distribution and integration mechanism 40 approach a value of 0. As a result, it is possible to set the clutch C0 to the R position to non-rotatably fix the first motor shaft 46 (motor MG1) and the sun gear 41. Subsequently, in a state in which the first motor shaft 46 and the sun gear 41 are non-rotatably fixed by using the clutch C0 while the carrier shaft 45a remains coupled with the drive shaft 66 by the clutch C1, when a torque command to the motors MG1 and MG2 is set to a value of 0, the motors MG1 and MG2 are idle without performing power operation or regenerative operation, and a power (torque) from the engine 22 is directly transmitted to the drive shaft 66 without conversion to electrical energy after undergoing a speed change at a fixed (constant) speed ratio (a speed ratio based on the gear ratio ρ of the power distribution and integration mechanism 40). Hereinafter, a mode in which the first motor shaft 46 and the sun gear 41 are non-rotatably fixed by using the clutch C0 while the carrier shaft 45a (carrier 45) remains coupled with the drive shaft 66 by the clutch C1 of the transmission 60 in this manner is also referred to as "simultaneous engagement mode". In particular, the state shown in FIG. 5 is referred to as a "2nd speed fixed state". It should be noted that when the speed ratio of the transmission 60 is changed in the shift down direction, basically the reverse procedure to that described above may be followed.

As described above, according to the hybrid vehicle 20 of the present embodiment, since the first torque conversion mode and the second torque conversion mode are alternately switched accompanying a switch between the first and the second speed state of the transmission 60, particularly when the rotation speed Nm1 or Nm2 of the motor MG1 or MG2 which functions as a motor is increased, the rotation speed Nm2 or Nm1 of the motor MG2 or MG1 which functions as a generator can be prevented from having a negative value. Therefore, the hybrid vehicle 20 can suppress the occurrence of a power circulation in which, as the rotation speed of the motor MG2 becomes negative in the first torque conversion mode, the motor MG1 uses part of the power outputted to the sun gear 41 to generate electric power and the motor MG2 consumes the electric power generated by the motor MG1 and outputs the power; and a power circulation in which as the rotation speed of the motor MG1 becomes negative in the second torque conversion mode, the motor MG2 uses part of the power outputted to the carrier 45 to generate electric power and the motor MG1 consumes the electric power generated by the motor MG2 and outputs the power; and can improve power transmission efficiency in a wider driving area. Moreover, as such a power circulation is suppressed, a maximum rotation speed of the motors MG1 and MG2 can also be suppressed, and thereby the motors MG1 and MG2 can be made more compact. In addition, by running the hybrid vehicle 20 in the above described simultaneous engagement mode the power from the engine 22 can be mechanically (directly) transmitted at a fixed speed ratio to the drive shaft 66, and hence opportunities for mechanically outputting the power from the engine 22 to the drive shaft 66 without conversion to electrical energy can be increased and the power transmission efficiency can be further increased in a wider driving area. In general, according to the power output apparatus using the engine, two motors, and the power distribution and integration mechanism such as a planetary gear mechanism, when the reduction gear ratio between the engine and the drive shaft is relatively large, more engine power is converted to electrical energy, and thus the power transmission efficiency deteriorates, and the motors MG1 and MG2 tend to generate heat. Therefore, the above described simultaneous engagement mode is advantageous particularly when the reduction gear ratio between the engine 22 and the drive shaft is relatively large. Further, according to the hybrid vehicle 20 of the present embodiment, when the speed state of the transmission 60 is changed, the simultaneous engagement mode is performed between the first torque conversion mode and the second torque conversion mode. Therefore, a so-called "torque loss" does not occur at the time of a change in the speed state, and the change in speed state, namely, the switching between the first torque conversion mode and the second torque conversion mode can be performed very smoothly and without a shock.

Figure 9:
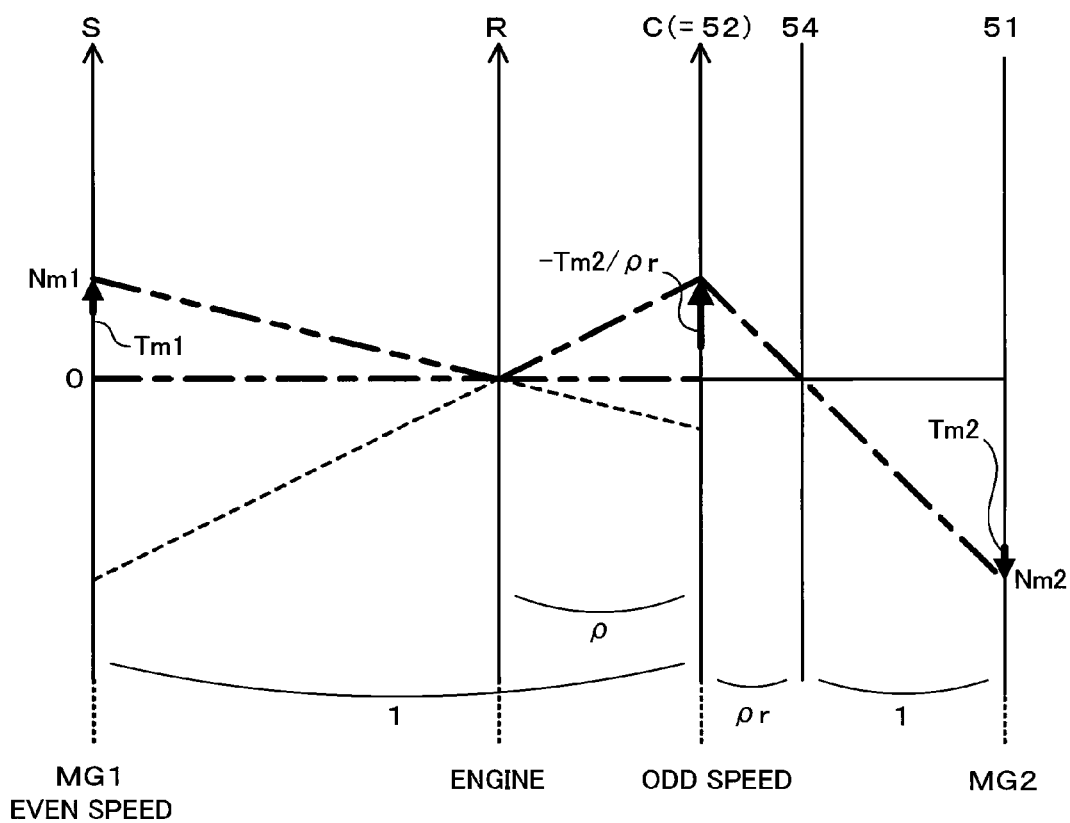
FIG. 9 is an explanatory drawing for explaining a motor drive mode in the hybrid vehicle 20 of the present embodiment.

Next, with reference to FIG. 6 and FIG. 9 and the like, the outline of the motor drive mode will be described. The motor drive mode is a mode in which, in a state in which the engine 22 is stopped, an electric power from the battery 35 is used to cause the motor MG1 and the motor MG2 to output a power, by which the hybrid vehicle 20 is driven. According to the hybrid vehicle 20 of the present embodiment, the motor drive mode is broadly classified into a clutch engagement single motor drive mode in which the clutch C0 is set to the M position and one of motors MG1 and MG2 is caused to output power while the motor MG1 remains connected to the sun gear 41 of the power distribution and integration mechanism 40; a clutch release single motor drive mode in which the clutch C0 is set to the R position and one of motors MG1 and MG2 is caused to output power in a state in which a connection between the motor MG1 and the sun gear 41 of the power distribution and integration mechanism 40 is released; and a 2-motor drive mode in which the clutch C0 is set to the R position and the power from both of the motors MG1 and MG2 can be utilized in a state in which a connection between the motor MG1 and the sun gear 41 of the power distribution and integration mechanism 40 is released.

When the clutch engagement single motor drive mode is performed, in a state in which the clutch C0 is set to the M position, as shown in FIG. 6, the clutch C1 is set to the L position to thereby set the transmission 60 to the first speed state to cause only the motor MG1 to output the power, or in a state in which the clutch C0 is set to the M position, as shown in FIG. 6, the clutch C1 is set to the R position to thereby set the transmission 60 to the second speed state to cause only the motor MG2 to output the power. In such a clutch engagement single motor drive mode, the clutch C0 allows the sun gear 41 of the power distribution and integration mechanism 40 and the first motor shaft 46 to be connected. Therefore, the motor MG1 or MG2 which does not output a power is idle by being corotated by the motor MG2 or MG1 which is outputting a power (see the broken line in FIG. 9). Moreover, when the clutch release single motor drive mode is performed, in a state in which the clutch C0 is set to the R position and the connection between the motor MG1 and the sun gear 41 of the power distribution and integration mechanism 40 is released, as shown in FIG. 6, the clutch C1 is set to the L position to thereby set the transmission 60 to the first speed state to cause only the motor MG1 to output the power, or as shown in FIG. 6, the clutch C1 is set to the R position to thereby set the transmission 60 to the second speed state to cause only the motor MG2 to output the power. In such a clutch release single motor drive mode, as shown by the single-dot chain line and the double-dot chain line in FIG. 9, the connection between the sun gear 41 and the motor MG1 is released by the clutch C0. Therefore, the crankshaft 26 of the engine 22 which is stopped by a function of the power distribution and integration mechanism 40 is prevented from corotating. In addition, the motor MG1 or MG2 which is stopped is prevented from corotating, and thereby it is possible to suppress a decrease in the power transmission efficiency. When the 2-motor drive mode is performed, in a state in which the clutch C0 is set to the R position and the connection between the motor MG1 and the sun gear 41 of the power distribution and integration mechanism 40 is released, as shown in FIG. 6, the clutch C1 is set to the M position to thereby set the transmission 60 to the above described 1st and 2nd speed simultaneous engagement state and thereafter drive and control at least one of the motors MG1 and MG2. This can prevent the engine 22 from corotating, can cause both the motors MG1 and MG2 to output a power, and can transmit a large power to the drive shaft 66 in the motor drive mode. Therefore, a so-called "hill start" can be favorably performed and a good towing capability and the like at the time of motor driving can be favorably secured.

Moreover, according to the hybrid vehicle 20 of the present embodiment, when the clutch release single motor drive mode is selected, the speed state of the transmission 60 can be easily changed so as to efficiently transmit a power to the drive shaft 66. For example, in the clutch release single motor drive mode, when the transmission 60 is set to the first speed state and only the motor MG1 is being caused to output a power, the rotation speed Nm2 of the motor MG2 is adjusted so as to synchronize rotation of the carrier shaft 45a with the rotation of the drive shaft 66, and if the clutch position of the clutch C1 of the transmission 60 is switched to the M position from the L position, the state can be changed to the aforementioned 1st and 2nd speed simultaneous engagement state, namely, the 2-motor drive mode. Subsequently, in this state, when the clutch position of the clutch C1 is switched from the M position to the R position and only the motor MG2 is caused to output a power, the power outputted by the motor MG2 in the aforementioned second speed state can be transmitted to the drive shaft 66. It should be noted that when the speed state of the transmission 60 is changed in the shift down direction in the clutch release single motor drive mode, basically the reverse procedure to that described above may be followed. As a result, according to the hybrid vehicle 20 of the present embodiment, even in the motor drive mode, the transmission 60 can be used to change the rotation speed of the sun gear 41 and the carrier 45 to increase the torque. Therefore, the maximum torque required for the motors MG1 and MG2 can be decreased and thus the motors MG1 and MG2 can be made compact. Moreover, in such a motor drive mode, before the speed state of the transmission 60 is changed, the simultaneous engagement state of the transmission 60, namely, the 2-motor drive mode is performed, and thus a so-called torque loss does not occur at the time of changing the speed state, and the speed state can be changed very smoothly and without a shock. It should be noted that when a required driving force is increased or the state of charge (SOC) of the battery 35 is decreased in these motor drive modes, whichever one of the motors MG1 or MG2 that does not output a power according to the speed state (clutch position of the clutch C1) of the transmission 60 is used to perform cranking of the engine 22, thereby starting the engine 22.

As described above, the hybrid vehicle 20 of the present embodiment includes the transmission 60 that has: the transmission differential rotation mechanism 61 having the sun gear 62 as an input element connected to the sun gear 41 which is the first element of the power distribution and integration mechanism 40, the ring gear 63 as a fixing element, and the carrier 65 as an output element, and configured such that the sun gear 62 and the carrier 65 can differentially rotate with each other; and the clutch C1 as a coupling mechanism capable of selectively coupling the sun gear 62 of the transmission differential rotation mechanism 61 and the carrier 45 which is the second element of the power distribution and integration mechanism 40 with the drive shaft 66. The transmission 60 can be configured with comparatively few components, has a simple and compact configuration, and is excellent in mountability. Further, according to the hybrid vehicle 20, when the carrier 65 (carrier shaft 65a) which is the output element of the transmission differential rotation mechanism 61 is coupled with the drive shaft 66 by the clutch C1 of the transmission 60, a power from the sun gear 41 which is the first element of the power distribution and integration mechanism 40 can be outputted to the drive shaft 66 after the power has been changed in speed by the transmission differential rotation mechanism 61. Furthermore, according to the hybrid vehicle 20, if both the carrier 65 (carrier shaft 65a) of the transmission differential rotation mechanism 61 and the carrier 45 (carrier shaft 45a) which is the second element of the power distribution and integration mechanism 40 are coupled to the drive shaft 66 by using the clutch C1 of the transmission 60, the power from the engine 22 can be mechanically (directly) transmitted to the drive shaft 66 at a fixed speed ratio. Moreover, according to the hybrid vehicle 20, if the carrier 45 (carrier shaft 45a) which is the second element of the power distribution and integration mechanism 40 is coupled with the drive shaft 66 by using the clutch C1 of the transmission 60, the power from the carrier 45 can be directly outputted to the drive shaft 66. Therefore, according to the transmission 60, a power from the power distribution and integration mechanism 40 can be changed in speed in a plurality of stages and outputted to the drive shaft 66. In addition, according to the hybrid vehicle 20, when the sun gear 41 which is the first element of the power distribution and integration mechanism 40 is coupled with the drive shaft 66 by the clutch C1 of the transmission 60, it is possible to cause the motor MG1 as a first motor connected to the sun gear 41 serving as an output element to function as a motor and to cause the motor MG2 as a second motor connected to the carrier 45 serving as a reaction element to function as a generator. Further, when the carrier 45 which is the second element of the power distribution and integration mechanism 40 is coupled with the drive shaft 66 by using the clutch C1 of the transmission 60, it is possible to cause the motor MG2 connected to the carrier 45 serving as an output element to function as a motor and to cause the motor MG1 connected to the sun gear 41 serving as a reaction element to function as a generator. Thus, according to the hybrid vehicle 20, by using the clutch C1 to suitably execute switching between coupling states, namely, speed states of the transmission 60, in order to prevent, in particular, the rotation speed Nm2 or Nm1 of the motor MG2 or MG1 functioning as a generator from becoming a negative value when the rotation speed Nm1 or Nm 2 of the motor MG1 or MG2 functioning as a motor has increased, the occurrence of a so-called "power circulation" can be suppressed. As a result, the hybrid vehicle 20 can favorably improve power transmission efficiency in a wider driving area, and also favorably improve fuel consumption and drive performance.

Further, when the transmission differential rotation mechanism 61 of the transmission 60 is a single pinion planetary gear mechanism, as in the present embodiment, the transmission 60 can be made more compact. Moreover, when the motors MG1 and MG2 are arranged approximately coaxially with the engine 22, and the power distribution and integration mechanism 40 is arranged between the motors MG1 and MG2 so as to be approximately coaxial with both of the motors MG1 and MG2, as in the present embodiment, the overall size of the power output apparatus including these elements can be made more compact. The hybrid vehicle 20 in which the engine 22, the motors MG1 and MG2, and the power distribution and integration mechanism 40 are arranged approximately coaxially in this manner has the sun gear shaft 41a and the first motor shaft 46 as hollow shafts connected to the sun gear 41 which is the first element of the power distribution and integration mechanism 40 and also connected to the sun gear 62 of the transmission differential rotation mechanism 61; and the carrier shaft 45a as a coupling shaft that is connected to the carrier 45 which is the second element of the power distribution and integration mechanism 40 and that extends toward the drive shaft 66 through the sun gear shaft 41a and first motor shaft 46 as hollow shafts and the transmission differential rotation mechanism 61; and is configured such that the clutch C1 of the transmission 60 can selectively couple one of or both of the carrier 65 (carrier shaft 65a) which is the output element of the transmission differential rotation mechanism 61 and the carrier shaft 45a with the drive shaft 66. Therefore, since a power from the sun gear 41 and a power from the carrier 45 of the power distribution and integration mechanism 40 can be outputted in an approximately coaxial manner and in the same direction, it is possible to arrange the transmission 60 in an approximately coaxially with the engine 22, the motors MG1 and MG2, and the power distribution and integration mechanism 40. Accordingly, this configuration is very suitable for the hybrid vehicle 20 that runs by driving mainly the rear wheels thereof.

The clutch C0 provided in the hybrid vehicle 20 is capable of non-rotatably fixing the first motor shaft 46 which is the rotating shaft of the motor MG1. Accordingly, even if the clutch C0 is used to non-rotatably fix the first motor shaft 46 when the carrier 45 of the power distribution and integration mechanism 40 connected to the motor MG2 as described above is coupled to the drive shaft 66 by the clutch C1 of the transmission 60, the power from the engine 22 can be mechanically (directly) transmitted to the drive shaft 66 at a fixed speed ratio. Therefore, the hybrid vehicle 20 can favorably improve power transmission efficiency in a wider driving area. It should be noted that the fixing mechanism as described above may be an element that fixes a rotation of an element (the sun gear 41 according to the present embodiment) that serves as a reaction element of the power distribution and integration mechanism when a minimum speed ratio is set by the transmission, or depending on the transmission configuration, may be an element that fixes the second motor shaft 55 of the motor MG2 or the carrier 45. Further, instead of providing the clutch C0 with the function of the fixing mechanism, a brake may be used separately from the clutch C0 to fix the first motor shaft 46 (sun gear 41) or the second motor shaft 55 (carrier 45).

The hybrid vehicle 20 of the present embodiment includes the clutch C0 that performs a connection between the sun gear shaft 41a and the first motor shaft 46, that is, the sun gear 41 and the motor MG1, and releases the connection therebetween. Therefore, according to the hybrid vehicle 20, causing the clutch C0 to release the connection between the sun gear shaft 41a and the first motor shaft 46 allows a function of the power distribution and integration mechanism 40 to substantially disconnect the engine 22 from the motors MG1 and MG2 and the transmission 60. Thus, according to the hybrid vehicle 20, when the clutch C0 is released and the engine 22 is stopped, the power from at least one of the motors MG1 and MG2 can be effectively transmitted to the drive shaft 66 accompanying a change in the speed state of the transmission 60. Therefore, according to the hybrid vehicle 20, it is possible to reduce the maximum torque required for the motors MG1 and MG2, and thus, further miniaturize the motors MG1 and MG2. However, the clutch C0 is not limited to an element that performs a connection between the sun gear 41 and the motor MG1, and releases the connection therebetween. More specifically, the clutch C0 may be an element that performs a connection between the carrier 45 (second element) and the second motor shaft 55 (motor MG2), and releases the connection therebetween; or may be an element that performs a connection between the crankshaft 26 of the engine 22 and the ring gear 42 (third element), and releases the connection therebetween.

Further, in a configuration that adopts the power distribution and integration mechanism 40 that is a double pinion planetary gear mechanism for which the gear ratio $\rho$ is a value less than 0.5, such as in the hybrid vehicle 20 of the present embodiment, the distribution ratio of a torque from the engine 22 is larger for the carrier 45 than for the sun gear 41. Accordingly, as in the example shown in FIG. 1, by disposing the reduction gear mechanism 50 between the carrier 45 and the motor MG2 it is possible to reduce the size of the motor MG2 and decrease the power loss thereof. Further, in this case, when the gear ratio of the power distribution and integration mechanism 40 is taken as $\rho$, by making the reduction gear ratio $\rho r$ of the reduction gear mechanism 50 a value that is close to $\rho/(1-\rho)$ it is possible to make the specifications of the motors MG1 and MG2 approximately identical. It is thereby possible to improve productivity with respect to the hybrid vehicle 20 or the power output apparatus and also reduce costs. However, the power distribution and integration mechanism 40 that is a double pinion planetary gear mechanism may be configured such that the gear ratio thereof is $\rho>0.5$. In such case, it is sufficient to configure the reduction gear mechanism 50 such that the reduction gear ratio thereof becomes a value that is close to $(1-\rho)/\rho$ and to dispose the reduction gear mechanism 50 between the sun gear 11 and the motor MG1 or motor MG2.

Figure 10:
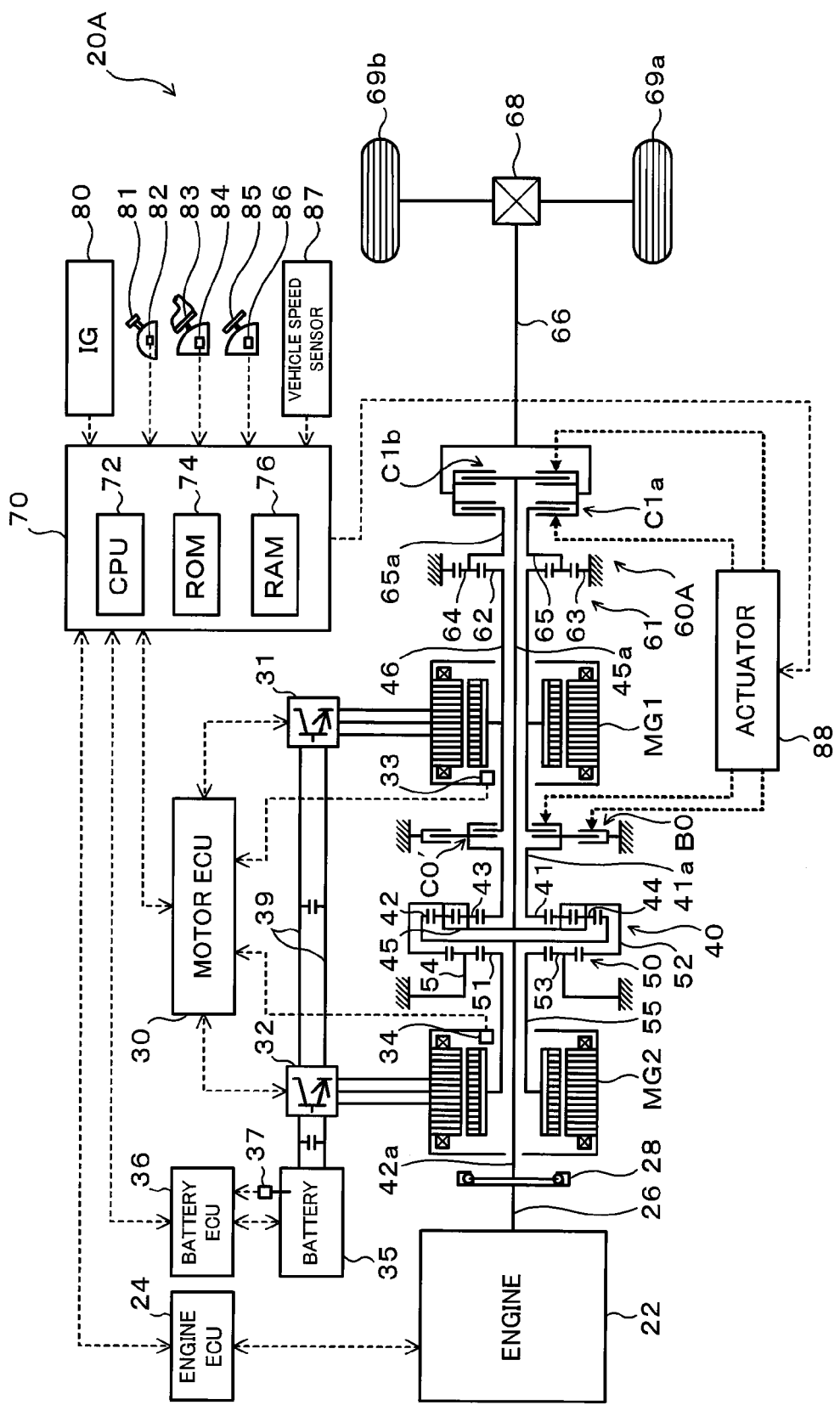
FIG. 10 is a schematic configuration view of a hybrid vehicle 20A which is a variation of the present embodiment.

FIG. 10 is a schematic configuration view of a hybrid vehicle 20A according to a modification example of the present embodiment. According to the hybrid vehicle 20A shown in FIG. 10, the functions of the clutch C0 of the aforementioned hybrid vehicle 20 are shared between a clutch C0' and a brake B0 that are respectively driven by a hydraulic actuator 88. The hybrid vehicle 20A includes a transmission 60A in which the functions of the aforementioned clutch C1 are shared between clutches C1a and C1b that are driven by the hydraulic actuator 88. More specifically, according to the hybrid vehicle 20A of the modification example, by driving the clutch C0' it is possible to perform a connection between the sun gear 41 of the power distribution and integration mechanism 40 and the first motor shaft 46 (motor MG1), and to release the connection therebetween; and by driving the brake B0 it is possible to non-rotatably fix the first motor shaft 46 which is the rotating shaft of the motor MG1. Further, the drive shaft 66 and the carrier shaft 65a connected to the carrier 65 which is the output element of the transmission differential rotation mechanism 61 are coupled by connecting the clutch C1a of the transmission 60A. Therefore, when the clutch C0' is connected, it is possible to realize the first coupling state in which the drive shaft 66 and the sun gear 41 which is the first element of the power distribution and integration mechanism are coupled through the sun gear shaft 41a, the first motor shaft 46, the transmission differential rotation mechanism 61, and the clutch C1a. Moreover, the carrier shaft 45a and the drive shaft 66 are coupled by connecting the clutch C1b. It is thereby possible to realize the second coupling state in which the drive shaft 66 and the carrier 45 which is the second element of the power distribution and integration mechanism 40 are coupled. Further, by connecting both the clutch C1a and the clutch C1b, it is possible to realize the third coupling state in which both the sun gear 41 and the carrier 45 of the power distribution and integration mechanism 40 are coupled with the drive shaft 66. FIG. 11 shows the setting states of clutch positions and the like of the clutch C0', brake B0, and clutches C1a and C1b of the transmission 60A when the hybrid vehicle 20A is running. Thus, according to the hybrid vehicle 20A having the hydraulic clutch C0' and brake B0, and the transmission 60A including the hydraulic clutches C1a and C1b, it is possible to obtain similar operational advantages as those of the above described hybrid vehicle 20.

Figure 12:
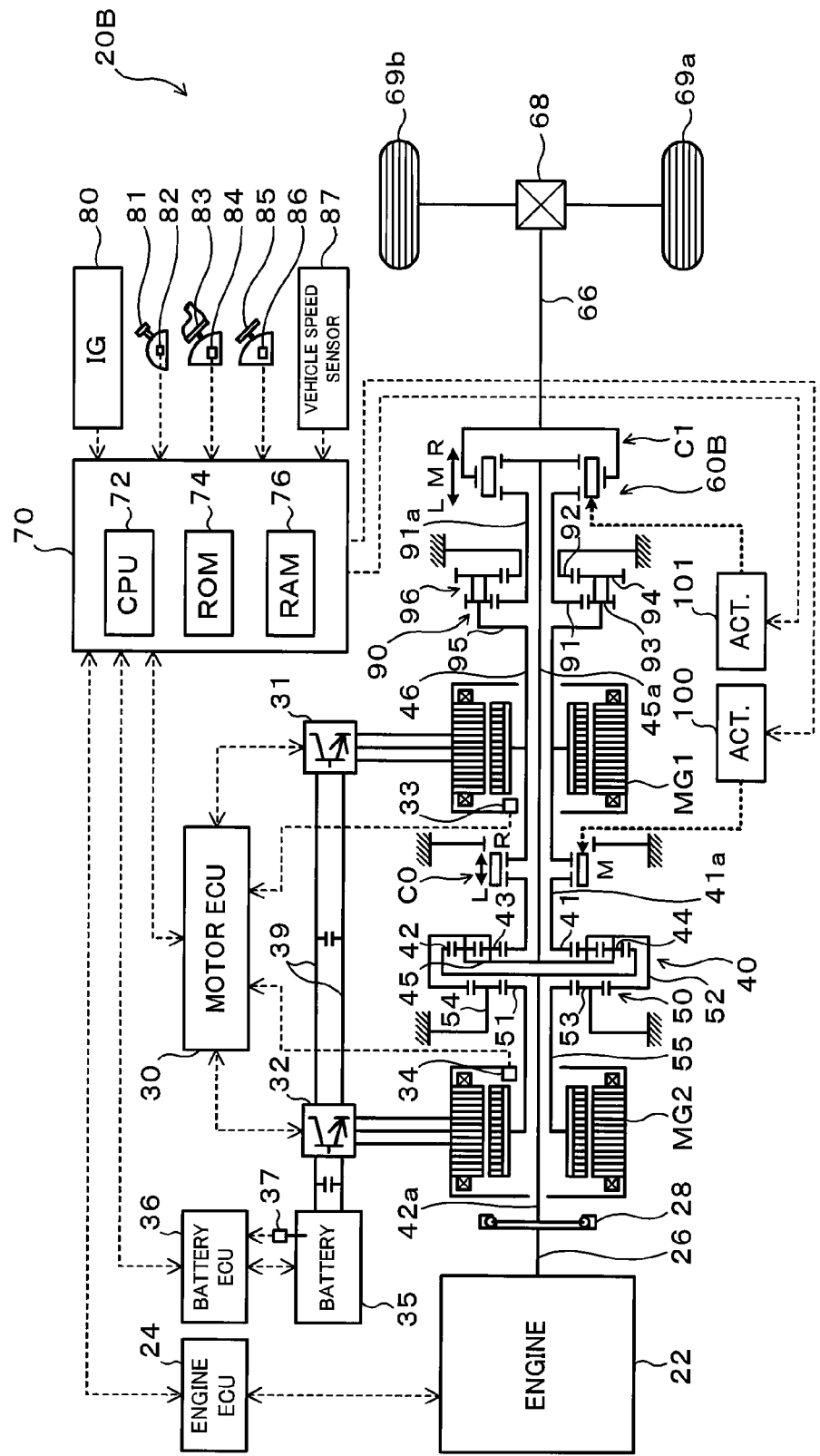
FIG. 12 is a schematic configuration view of a hybrid vehicle 20B which is a variation of the present embodiment.

FIG. 12 is a schematic configuration view of a hybrid vehicle 20B according to a modification example of the present embodiment. Instead of the transmission 60 of the hybrid vehicle 20 described above, the hybrid vehicle 20B shown in FIG. 12 has a transmission 60B including a transmission differential rotation mechanism 90 that is a planetary gear mechanism including a stepped gear 96. More specifically, the transmission differential rotation mechanism 90 of the transmission 60B is a planetary gear mechanism that includes a first sun gear 91 and a second sun gear 92 having a different number of teeth to each other, and a carrier 95 that holds a plurality of stepped gears 96 configured by coupling a first pinion gear 93 meshed with the first sun gear 91 and a second pinion gear 94 meshed with the second sun gear 92. In this case, as shown in FIG. 12, the carrier 95 (input element) of the transmission differential rotation mechanism 90 is connected to the first motor shaft 46, and the second sun gear 92 (fixing element) is non-rotatably fixed with respect to the transmission case. A hollow sun gear shaft 91a extending toward the rear part of the vehicle is connected to the first sun gear 91 (output element) of the transmission differential rotation mechanism 90. The carrier shaft 45a that extends from the carrier 45 which is the second element of the power distribution and integration mechanism 40 passes through the first motor shaft 46 and the sun gear shaft 91a. In the hybrid vehicle 20B, the clutch C1 is configured to be capable of selectively coupling one of or both of the first sun gear 91 (sun gear shaft 91a) which is the output element of the transmission differential rotation mechanism 90 and the carrier 45 (carrier shaft 45a) which is the second element of the power distribution and integration mechanism 40 with the drive shaft 66. More specifically, when the clutch position of the clutch C1 of the transmission 60B is set to the L position, the sun gear shaft 91a connected to the first sun gear 91 which is the output element of the transmission differential rotation mechanism 90 and the drive shaft 66 are coupled. Therefore, when the clutch C0 is connected, it is possible to realize the first coupling state in which the drive shaft 66 and the sun gear 41 which is the first element of the power distribution and integration mechanism are coupled through the sun gear shaft 41a, the first motor shaft 46, the transmission differential rotation mechanism 90, and the clutch C1. In addition, the carrier shaft 45a and the drive shaft 66 are coupled when the clutch C1 of the transmission 60B is set to the R position. It is thereby possible to realize the second coupling state in which the drive shaft 66 and the carrier 45 which is the second element of the power distribution and integration mechanism 40 are coupled. Further, when the clutch C1 of the transmission 60B is set to the M position, it is possible to realize the third coupling state in which both the sun gear 41 and the carrier 45 of the power distribution and integration mechanism 40 are coupled with the drive shaft 66. According to the hybrid vehicle 20B having the transmission 60B, it is possible to also obtain similar operational advantages as those of the above described hybrid vehicles 20 and 20A. Further, according to the transmission 60B having the transmission differential rotation mechanism 90 including the stepped gear 96, it is possible to easily set a larger reduction gear ratio in comparison to a transmission having a single pinion planetary gear mechanism for which the rotation speed of a pinion gear tends to increase when a larger reduction gear ratio is set.

Figure 13:
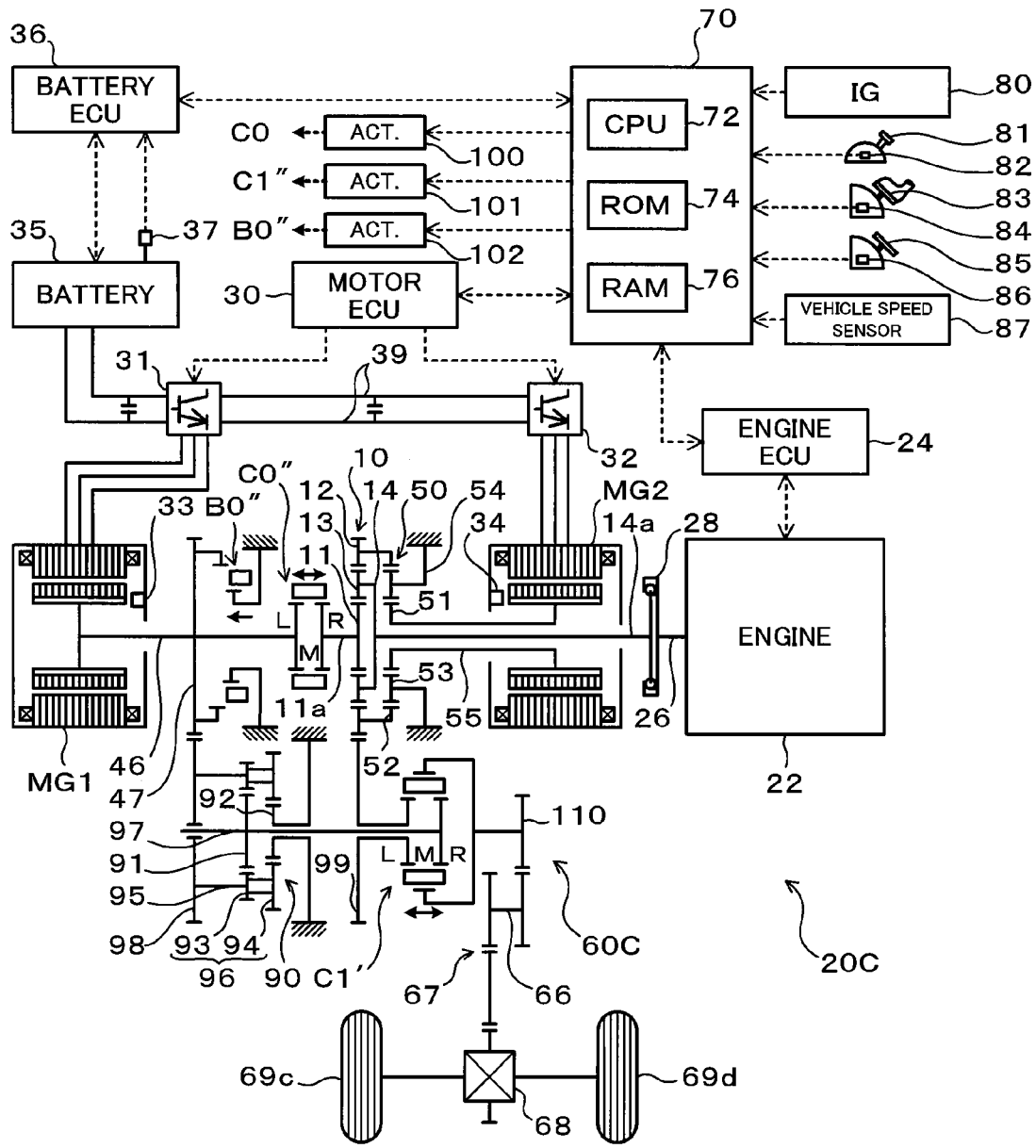
FIG. 13 is a schematic configuration view of a hybrid vehicle 20C which is a variation of the present embodiment.

FIG. 13 is a schematic configuration view of a hybrid vehicle 20C according to another modification example of the present embodiment. In contrast to the above described hybrid vehicles 20, 20A, and 20B that are configured as rear-wheel drive vehicles, a hybrid vehicle 20C of the present modification example is configured as a front-wheel drive vehicle. As shown in FIG. 13, the hybrid vehicle 20C has a power distribution and integration mechanism 10 that is a single pinion planetary gear mechanism that includes a sun gear 11 which is an external gear, a ring gear 12 which has internal teeth formed at an inner periphery thereof and external teeth formed at an outer periphery thereof and which is arranged concentrically with the sun gear 11, and a carrier 14 which holds a plurality of pinion gears 13 that are meshed with both the sun gear 11 and the internal teeth of the ring gear 12; and is configured such that the sun gear 11 (first element), the ring gear 12 (second element), and the carrier 14 (third element) can differentially rotate with each other. According to the present embodiment, the power distribution and integration mechanism 10 is configured such that the gear ratio ρ (value obtained by dividing the number of teeth of the sun gear 11 by the number of teeth of the ring gear 12) thereof is ρ<0.5. The motor MG1 (rotor) serving as the first motor is connected to the sun gear 11 which is the first element of the power distribution and integration mechanism 10 through a sun gear shaft 11a that extends from the sun gear 11 to the opposite side of the engine 22, the clutch C0", and the first motor shaft 46. Moreover, the motor MG2 (hollow rotor) serving as the second motor is connected to the ring gear 12 which is the second element through the reduction gear mechanism 50 disposed on the engine 22 side of the power distribution and integration mechanism 10 and a hollow second motor shaft 55 extending toward the engine 22 from the reduction gear mechanism 50 (sun gear 51). Further, a crankshaft 26 of the engine 22 is connected to the carrier 14 which is a third element through the damper 28 and the carrier shaft 14a that extends through the second motor shaft 55 and the motor MG2.

The transmission 60C includes the transmission differential rotation mechanism 90 including the stepped gear 96; a transmission shaft 97; a first coupling gear train that is configured by a drive gear 47 that is mounted to the first motor shaft 46, and a first driven gear 98 that is always meshed with the drive gear 47; a second coupling gear train that is configured by the ring gear 12 of the power distribution and integration mechanism 10, and a second driven gear 99 that is always meshed with the external teeth of the ring gear 12; an output gear 110; and a clutch C1'. The transmission shaft 97 is rotatably supported by an unshown bearing, extends in parallel with the first motor shaft 46 and the second motor shaft 55, and is fixed to the first sun gear 91 which is the output element of the transmission differential rotation mechanism 90. Further, the transmission shaft 97 is connected to the second sun gear 92 which is the fixing element of the transmission differential rotation mechanism 90, and also passes though a hollow shaft fixed to the transmission case to extend in the rightward direction in the figure. The first driven gear 98 of the first coupling gear train is supported so as to be rotatable around one end (left end in the figure) of the transmission shaft 97, and is connected to the carrier 95 which is the input element of the transmission differential rotation mechanism 90. The second driven gear 99 which is meshed with the external teeth of the ring gear 12 to configure the second coupling gear train is arranged to the side (right side in the figure) of the transmission differential rotation mechanism 90, and is supported by an unshown bearing so as to be rotatable around the transmission shaft 97. The output gear 110 is coupled to front wheels 69c and 69d as drive wheels through a gear mechanism 67 including the drive shaft 66, and a differential gear 68. It should be noted that, according to the present embodiment, although the number of external teeth of the drive gear 47 included in the first coupling gear train and the number of external teeth of the ring gear 12 included in the second coupling gear train are assumed to be the same, and the number of teeth of the first driven gear 98 included in the first coupling gear train and the number of teeth of the second driven gear 99 included in the second coupling gear train are assumed to be the same, the number of teeth of these gears can be arbitrarily decided.

The clutch C1' included in the transmission 60C is an element that is capable of coupling one of or both of the transmission shaft 97 and the second driven gear 99 of the second coupling gear train with the output gear 110. In the present embodiment, the clutch C1' is configured, for example, as a dog clutch that includes a dog fixed to an end (right end in the figure) of the transmission shaft 97, a dog fixed to the second driven gear 99, a dog fixed to the output gear 110 so as to be positioned at the periphery of the dog of the transmission shaft 97 and the dog of the second driven gear 99, and an engagement member that is capable of meshing with these dogs and that is driven by the electric, electromagnetic, or hydraulic actuator 101. As shown in FIG. 13, the clutch position as the position of the engagement member can be selectively switched between an "R position", an "M position", and an "L position". More specifically, when the clutch position of the clutch C1' of the transmission 60C is set to the R position, the dog of the transmission shaft 97 connected to the first sun gear 91 which is the output element of the transmission differential rotation mechanism 90 and the dog of the output gear 110 are coupled through the engagement member. Therefore, when the clutch C0" is connected, it is possible to realize the first coupling state in which the sun gear 11 which is the first element of the power distribution and integration mechanism and the drive shaft 66 are coupled through the sun gear shaft 11a, the first motor shaft 46, the first coupling gear train (drive gear 47 and first driven gear 98), the transmission shaft 97, the clutch C1', the output gear 110, and the like. Further, when the clutch C1' of the transmission 60C is set to be in the L position, the dog of the second driven gear 99 of the second coupling gear train and the dog of the output gear 110 are coupled through the engagement member, and it is thereby possible to realize the second coupling state in which the ring gear 12 which is the second element of the power distribution and integration mechanism 10 is coupled with the drive shaft 66. Furthermore, when the clutch C1' of the transmission 60C is set to be in the M position, the dog of the transmission shaft 97, the dog of the second driven gear 99, and the dog of the output gear 110 are connected through the engagement member, and it is thereby possible to realize the third coupling state in which both the sun gear 11 of the power distribution and integration mechanism 10 and the ring gear 12 are coupled with the drive shaft 66. It should be noted that, according to the hybrid vehicle 20C shown in FIG. 13, a brake B0" is provided that functions as a fixing mechanism capable of non-rotatably fixing the first motor shaft 46 which is the rotating shaft of the motor MG1 in the vicinity of the motor MG1. In this case, the brake B0" is configured as a dog clutch that can connect a dog fixed to the drive gear 47 and a fixing dog fixed to the transmission case with less loss through an engagement member that is driven by an electric, electromagnetic, or hydraulic actuator 102, and can also release the connection therebetween.

Thus, a hybrid vehicle according to the present invention may also be configured as a front-wheel drive vehicle. The hybrid vehicle 20C shown in FIG. 13 can also obtain the same operational advantages as the above described hybrid vehicles 20, 20A, and 20B. Further, since the transmission 60C shown in FIG. 13 includes the clutch C1' as a switching mechanism between the transmission shaft 97 that extends in parallel with the first and second motor shafts 46 and 55, and the parallel shaft-type first and second coupling gear trains, it is possible to configure the power output apparatus as a two-shaft type apparatus by arranging the clutch C1' and the transmission differential rotation mechanism 90 around the transmission shaft 97 so as to be coaxial therewith; and even if the engine 22, the motors MG1 and MG2, and the power distribution and integration mechanism 10 are arranged in an approximately coaxial manner, an increase in the axial direction (vehicle width direction) dimensions of the power output apparatus can be suppressed. Accordingly, the power output apparatus shown in FIG. 13 is compact and excellent in mountability, and is very suitable for the hybrid vehicle 20C that runs mainly by driving the front wheels thereof. Further, by adopting a configuration, such as in the transmission 60C, in which the sun gear 11 of the power distribution and integration mechanism 10 is coupled with the transmission shaft 97 through the parallel shaft-type first coupling gear train, and the ring gear 12 of the power distribution and integration mechanism 10 is coupled with the drive shaft 66 through the parallel shaft-type second coupling gear train, it is also possible to freely set a speed ratio between the sun gear 11 and the transmission shaft 97 and a speed ratio between the ring gear 12 and the drive shaft 66. Thus, the degree of freedom in setting a speed ratio of the transmission 60C can be increased, and the power transmission efficiency can be improved even further. It should be noted that although in the example shown in FIG. 13 external teeth are formed on the ring gear 12 of the power distribution and integration mechanism 10 and the ring gear 12 itself constitutes a part of the second coupling gear train, the present embodiment is not limited thereto. More specifically, instead of forming external teeth on the ring gear 12, the second coupling gear train may be configured by connecting a gear that is the same as the drive gear 47 to the ring gear 12 and meshing the relevant gear with the second driven gear 99. Further, the transmission differential rotation mechanism of the transmission 60C may be a single pinion planetary gear mechanism. Furthermore, the clutch C0" and brake B0" may be elements that are driven by a hydraulic actuator, or may be two clutches driven by a hydraulic actuator that are made to share the respective functions of the clutch C1' of the transmission 60C. The hybrid vehicle 20C includes the power distribution and integration mechanism 10 that is a single pinion planetary gear mechanism for which the gear ratio $\rho$ is a value that is less than 0.5 as described above. According to the power distribution and integration mechanism 10 having such specifications, the distribution ratio of the torque from the engine 22 is greater for the ring gear 12 than for the sun gear 11. Accordingly, as shown in FIG. 13, it is possible to reduce the size of the motor MG2 and decrease the power loss thereof by disposing the reduction gear mechanism 50 between the ring gear 12 and the motor MG2. In this case, since the specifications of the motors MG1 and MG2 can be made approximately identical by making the reduction gear ratio ρr of the reduction gear mechanism 50 a value that is close to the gear ratio ρ of the power distribution and integration mechanism 10, it is possible to improve productivity with respect to the engine 22 and the power output apparatus and also reduce costs.

It should be noted that according to the above described hybrid vehicles 20, 20A, 20B, and 20C, any of or all of the following mechanisms may be omitted: a mechanism that performs a connection between the sun gear 41 and the motor MG1, and releases the connection therebetween; a mechanism that fixes the first motor shaft 46 (sun gear 41, 11); and the reduction gear mechanism 50. Further, the aforementioned hybrid vehicles 20, 20A, and 20B may each be configured as a rear-wheel-drive based four-wheel-drive vehicle, and the aforementioned hybrid vehicle 20C may be configured as a front-wheel-drive based four-wheel-drive vehicle. In addition, in the aforementioned hybrid vehicles 20, 20A, and 20B, the power distribution and integration mechanism 40 may be a planetary gear mechanism including a first sun gear and a second sun gear that have a different number of teeth to each other; and a carrier having at least one stepped gear configured by coupling a first pinion gear meshed with the first sun gear and a second pinion gear meshed with the second sun gear. Further, the power distribution and integration mechanism 10 in the above described hybrid vehicle 20C may be configured as a double pinion planetary gear mechanism. Moreover, in the above embodiments, although the power output apparatus has been described as being mounted to the hybrid vehicles 20, 20A, 20B, and 20C, the power output apparatus according to the present invention may be mounted to a vehicle other than a car, as well as to a mobile body such as a vessel and an aircraft, and may also be installed in fixed equipment such as construction equipment.

Hereinbefore, the embodiments of the present invention have been described with reference to drawings, but the present invention is not limited to the above embodiments. It will be apparent that various modifications can be made to the present invention without departing from the spirit and scope of the present invention.

INDUSTRIAL APPLICABILITY

The present invention can be used in a manufacturing industry of a power output apparatus, a hybrid vehicle and the like.

The invention claimed is:

1. A power output apparatus for outputting a power to a drive shaft, said power output apparatus comprising:
an internal combustion engine;
a first motor capable of inputting and outputting a power;
a second motor capable of inputting and outputting a power;
a power distribution and integration mechanism including a first element connected to a rotating shaft of said first motor, a second element connected to a rotating shaft of said second motor, and a third element connected to an engine shaft of said internal combustion engine, said power distribution and integration mechanism configured such that these three elements can be differentially rotated with each other; and
a transmission mechanism including a transmission differential rotation mechanism that has an input element connected to one of said first and second elements of said power distribution and integration mechanism, a fixing element, and an output element, said transmission differential rotation mechanism configured such that said input element and said output element can be differentially rotated with each other; and a coupling mechanism capable of selectively coupling said output element of said transmission differential rotation mechanism and the other of said first and second elements of said power distribution and integration mechanism with said drive shaft; and
a control module for controlling said coupling mechanism so as to enable selectively switching between a state in which said output element of said transmission differential rotation mechanism and said drive shaft are coupled; a state in which both of said output element of said transmission differential rotation mechanism and the other of said first and second elements of said power distribution and integration mechanism are coupled with said drive shaft; and a state in which the other of said first and second elements of said power distribution and integration mechanism and said drive shaft are coupled.

2. A power output apparatus according to claim 1, wherein said transmission differential rotation mechanism of said transmission mechanism is a three-element planetary gear mechanism.

3. A power output apparatus according to claim 2, wherein said transmission differential rotation mechanism is a planetary gear mechanism including a first sun gear and a second sun gear having a different number of teeth from that of said first sun gear, and a carrier having at least one stepped gear configured by coupling a first pinion gear that meshes with said first sun gear and a second pinion gear that meshes with said second sun gear.

4. A power output apparatus according to claim 1, wherein said first and second motors are arranged coaxially with said internal combustion engine, and wherein said power distribution and integration mechanism is arranged coaxially with said first and second motors between said first motor and said second motor.

5. A power output apparatus according to claim 4, said power output apparatus further comprising:
a hollow shaft that is connected to one of said first and second elements of said power distribution and integration mechanism, said hollow shaft also connected to said input element of said transmission differential rotation mechanism; and
a coupling shaft that is connected to the other of said first and second elements, said coupling shaft extending through said hollow shaft and said transmission differential rotation mechanism toward said drive shaft;
wherein said coupling mechanism of said transmission mechanism is capable of selectively coupling one of or both of said output element of said transmission differential rotation mechanism and said coupling shaft with said drive shaft.

6. A power output apparatus according to claim 1, said power output apparatus further comprising a fixing mechanism capable of non-rotatably fixing one of said rotating shaft of said first motor and said rotating shaft of said second motor.

7. A power output apparatus according to claim 1, said power output apparatus further comprising a connection and disconnection mechanism capable of performing any of a connection and a release of the connection between said first motor and said first element; a connection and a release of the connection between said second motor and said second element; and a connection and a release of the connection between said internal combustion engine and said third element.

8. A power output apparatus according to claim 1, wherein one element among said first and second elements of said power distribution and integration mechanism into which a larger torque is inputted from said third element connected to said engine shaft is connected to said first motor or said second motor through a reduction mechanism that reduces rotations of a rotating shaft of said first motor or said second motor.

9. A power output apparatus according to claim 8, wherein said power distribution and integration mechanism is a double pinion planetary gear mechanism including a sun gear, a ring gear, and a carrier which holds at least one pair of two pinion gears that mesh with each other and one of which meshes with said sun gear and the other of which meshes with said ring gear, and wherein said first element is one of said sun gear and said carrier, said second element is the other of said sun gear and said carrier, and said third element is said ring gear.

10. A power output apparatus according to claim 9, wherein said power distribution and integration mechanism is configured such that, when a gear ratio of said power distribution and integration mechanism that is a value calculated by dividing the number of teeth of said sun gear by a number of teeth of said ring gear is taken as $\rho$, $\rho<0.5$; and wherein said reduction mechanism is configured such that a reduction gear ratio becomes a value that is close to $\rho/(1-\rho)$, said reduction mechanism arranged between said first motor or said second motor and said carrier.

11. A power output apparatus according to claim 9, wherein said power distribution and integration mechanism is configured such that, when a gear ratio of said power distribution and integration mechanism that is a value calculated by dividing a number of teeth of said sun gear by the number of teeth of said ring gear is taken as $\rho$, $\rho>0.5$; and wherein said reduction mechanism is configured such that a reduction gear ratio becomes a value that is close to $(1-\rho)/\rho$, said reduction mechanism arranged between said first motor or said second motor and said sun gear.

12. A power output apparatus according to claim 8, wherein said power distribution and integration mechanism is a single pinion planetary gear mechanism including a sun gear, a ring gear, and a carrier which holds at least one pinion gear that meshes with both of said sun gear and said ring gear, wherein said first element is one of said sun gear and said ring gear, said second element is the other of said sun gear and said ring gear, and said third element is said carrier; and wherein said reduction mechanism is configured so as to have a reduction gear ratio which is close to a gear ratio $\rho$ of said power distribution and integration mechanism that is a value calculated by dividing a number of teeth of said sun gear by a number of teeth of said ring gear, said reduction mechanism arranged between said first or second motor and said ring gear.

13. A hybrid vehicle comprising a power output apparatus according to claim 1, and including drive wheels driven by a power from said drive shaft.

14. A power output apparatus for outputting a power to a drive shaft, said power output apparatus comprising:
an internal combustion engine;
a first motor capable of inputting and outputting a power, said first motor arranged coaxially with said internal combustion engine;
a second motor capable of inputting and outputting a power, said second motor arranged coaxially with said internal combustion engine;
a power distribution and integration mechanism including a first element connected to a rotating shaft of said first motor, a second element connected to a rotating shaft of said second motor, and a third element connected to an engine shaft of said internal combustion engine, said power distribution and integration mechanism configured such that these three elements can be differentially rotated with each other, said power distribution and integration mechanism arranged coaxially with said first and second motors between said first motor and said second motor; and
a transmission mechanism including a transmission differential rotation mechanism that has an input element connected to one of said first and second elements of said power distribution and integration mechanism, a fixing element, and an output element, said transmission differential rotation mechanism configured such that said input element and said output element can be differentially rotated with each other; and a coupling mechanism capable of selectively coupling said output element of said transmission differential rotation mechanism and the other of said first and second elements of said power distribution and integration mechanism with said drive shaft;
wherein said coupling mechanism of said transmission mechanism includes:
a transmission shaft that extends approximately parallel to said rotating shafts of said first and second motors, and is connected to said input element of said transmission differential rotation mechanism;
a first parallel shaft gear train that couples one of said first and second elements of said power distribution and integration mechanism with said transmission shaft;
a second parallel shaft gear train that is coupled with the other of said first and second elements; and
a switching mechanism capable of selectively switching between a first coupling state in which said transmission shaft and said drive shaft are coupled, a second coupling state in which said second parallel shaft gear train and said drive shaft are coupled, and a third coupling state in which both of said transmission shaft and said second parallel shaft gear train are coupled with said drive shaft.

* * * * *